(12) United States Patent
Pitt et al.

(10) Patent No.: US 12,540,331 B2
(45) Date of Patent: Feb. 3, 2026

(54) INCREASE IN CORN TRANSFORMATION EFFICACY BY THE N-TERMINUS OF A TALE

(71) Applicant: BASF PLANT SCIENCE COMPANY GMBH, Ludwigshafen (DE)

(72) Inventors: Thaquoris Pitt, Research Triangle Park, NC (US); Sean McAdams, Research Triangle Park, NC (US); Minesh Patel, Research Triangle Park, NC (US); Mary F. Dubois, Snow Camp, NC (US); Leendert W. Neuteboom, Youngsville, NC (US)

(73) Assignee: BASF PLANT SCIENCE COMPANY GMBH, Ludwigshafen (DE)

( * ) Notice: Subject to any disclaimer, the term of this patent is extended or adjusted under 35 U.S.C. 154(b) by 368 days.

(21) Appl. No.: 17/767,580

(22) PCT Filed: Oct. 9, 2020

(86) PCT No.: PCT/EP2020/078451
§ 371 (c)(1),
(2) Date: Apr. 8, 2022

(87) PCT Pub. No.: WO2021/069684
PCT Pub. Date: Apr. 15, 2021

(65) Prior Publication Data
US 2024/0110193 A1    Apr. 4, 2024

(30) Foreign Application Priority Data
Oct. 11, 2019   (EP) .................................... 19202802

(51) Int. Cl.
*C12N 15/82* (2006.01)
*C07K 14/195* (2006.01)

(52) U.S. Cl.
CPC ........ *C12N 15/8205* (2013.01); *C07K 14/195* (2013.01)

(58) Field of Classification Search
None
See application file for complete search history.

(56) References Cited

U.S. PATENT DOCUMENTS

2011/0201118 A1* 8/2011 Yang ........................ C12N 9/22
                                                              435/441
2016/0298098 A1* 10/2016 Duchateau .............. A61P 43/00

FOREIGN PATENT DOCUMENTS

WO    WO-2011/146121 A1    11/2011
WO    WO-2013074999 A1 *   5/2013   ........... C07K 14/195

OTHER PUBLICATIONS

Boch et al., Breaking the code of DNA binding specificity of TAL-type III effectors, Science, 326(5959):1509-12 (Dec. 2009).
Christian et al., Targeting DNA double-strand breaks with TAL effector nucleases, Genetics, 186(2):757-61 (Oct. 2010).
Cuculis et al., Direct observation of TALE protein dynamics reveals a two-state search mechanism, Nat. Commun., 6:7277 (Jun. 2015).
International Application No. PCT/EP2020/078451, International Search Report and Written Opinion, mailed Dec. 14, 2020.
Ji et al., Interfering TAL effectors of Xanthomonas oryzae neutralize R-gene-mediated plant disease resistance, Nat. Commun., 7:13435 (2016).
Khan et al., Use of TALEs and TALEN technology for genetic improvement of plants, Plant Mol. Biol. Rep., 35:1-19 (2017).
Li et al., TALEN utilization in rice genome modifications, Methods, 69(1):9-16 (2014).
Miller et al., A TALE nuclease architecture for efficient genome editing, Nat. Biotechnol., 29(2):143-8 (Feb. 2011).
Mohanta et al., Genome editing tools in plants, Genes, 8:399 (2017).
Moore et al., Transcription activator-like effectors: a toolkit for synthetic biology, ACS Synth. Biol., 3(10):708-16 (Oct. 2014).
Mussolino et al., A novel TALE nuclease scaffold enables high genome editing activity in combination with low toxicity, Nucleic Acids Res., 39(21):9283-93 (Nov. 2011).
Read et al., Suppression of Xo1-mediated disease resistance in rice by a truncated, non-DNA-binding TAL effector of xanthomonas oryzae, Front Plant Sci., 7:1516 (2016).
Scholze et al., TAL effectors are remote controls for gene activation, Curr. Opin. Microbiol., 14(1):47-53 (Feb. 2011).
Schornack et al., Expression levels of avrBs3-like genes affect recognition specificity in tomato Bs4—but not in pepper Bs3-mediated perception, Mol. Plant Microbe Interact., 18(11):1215-25 (Nov. 2005).
Schornack et al., The tomato resistance protein Bs4 is a predicted non-nuclear TIR-NB-LRR protein that mediates defense responses to severely truncated derivatives of AvrBs4 and overexpressed AvrBs3, Plant J., 37(1):46-60 (Jan. 2004).
Scott et al., Targeted genome regulation and modification using transcription activator-like effectors, FEBS J., 281(20):4583-97 (Oct. 2014).
Sun et al., Optimized TAL effector nucleases (TALENs) for use in treatment of sickle cell disease, Mol. Biosyst., 8(4):1255-63 (Apr. 2012).
Triplett et al., A resistance locus in the American heirloom rice variety Carolina Gold Select is triggered by TAL effectors with diverse predicted targets and is effective against African strains of Xanthomonas oryzae pv. oryzicola, Plant J., 87(5):472-83 (Sep. 2016).
Wakasa et al., Agrobacterium-mediated transformation of a low glutelin mutant of 'Koshihikari' rice variety using the mutated-acetolactate synthase gene derived from rice genome as a selectable marker, Plant Cell Rep., 26(9):1567-73 (Sep. 2007).
Wan et al., Potential role of the last half repeat in TAL effectors revealed by a molecular simulation study, Biomed. Res. Int., 2016:8036450 (2016).

(Continued)

*Primary Examiner* — Matthew R Keogh
(74) *Attorney, Agent, or Firm* — ArentFox Schiff LLP

(57) ABSTRACT

The present invention is in the field of molecular biology and relates to improved methods for plant transformation and to polynucleotides and polypeptides for achieving the same.

31 Claims, 11 Drawing Sheets

Figure 1:
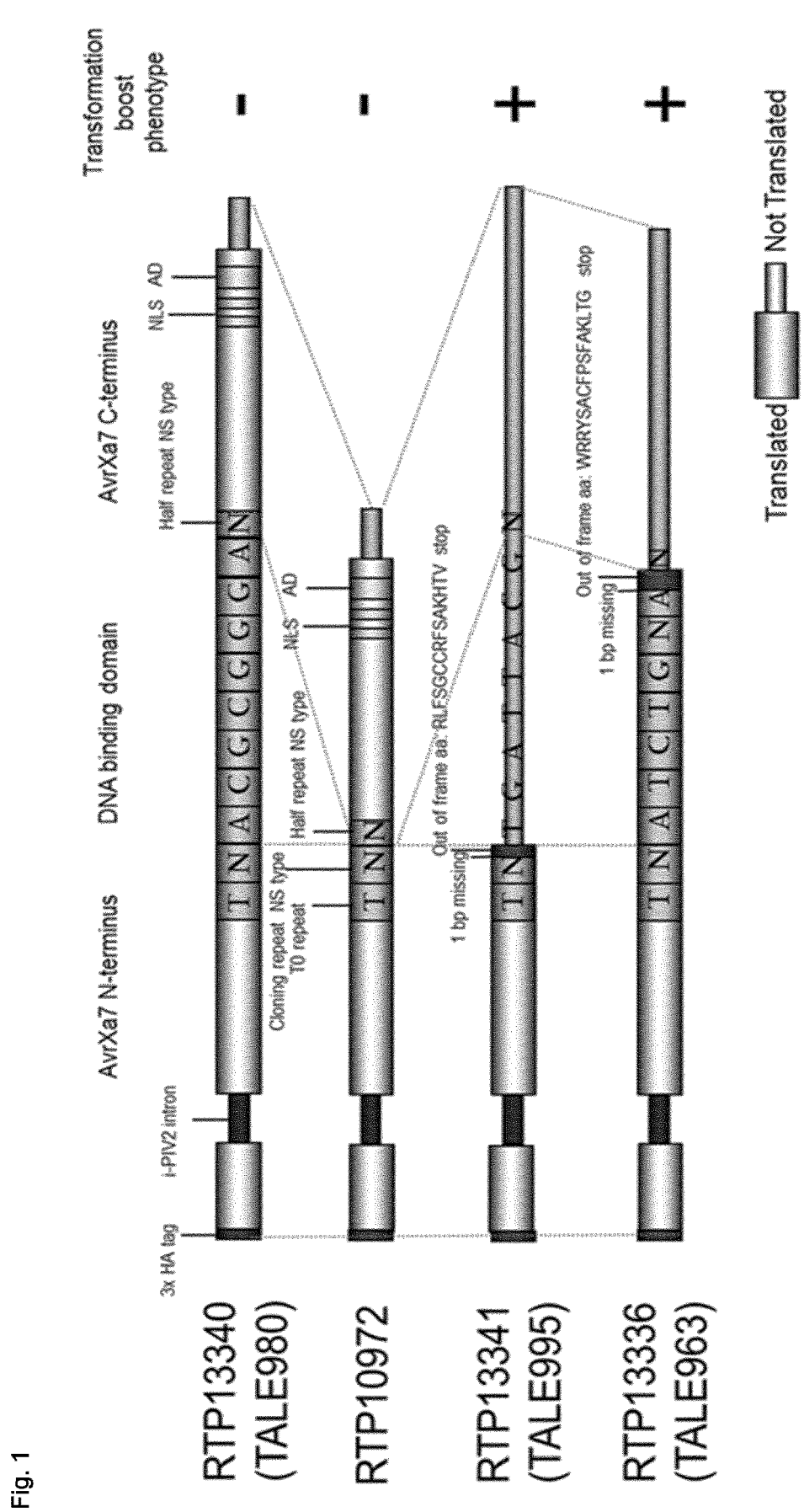

Specification includes a Sequence Listing.

(56) References Cited

OTHER PUBLICATIONS

Winicov et al., The MsPRP2 promoter enables strong heterologous gene expression in a root-specific manner and is enhanced by overexpression of Alfin 1, Planta, 219(6):925-35 (Oct. 2004).
Zhang et al., Programmable sequence-specific transcriptional regulation of mammalian genome using designer TAL effectors, Nat. Biotechnol., 29(2):149-53 (Feb. 2011).

* cited by examiner

Fig. 8

```
Hax3      MDPIRSRTPSPARELLSGPQPDGVQPTADRGVSPPAGGPLDGLPARRTMSRTRLPSPPAP
AvrBs3    MDPIRSRTPSPARELLPGPQPDGVQPTADRGVSPPAGGPLDGLPARRTMSRTRLPSPPAP
AvrXa7    MDPIRSRTPSPARELLPGPQPDRVQPTADRGGAPPAGGPLDGLPARRTMSRTRLPSPPAP
AvrXa10   MDPIRSRTPSPARELLPGPQPDRVQPTADRGGAPPAGGPLDGLPARRTMSRTRLPSPPAP
          ****************.***** *******.****************************

Hax3      SPAFSADSFSDLLRQFDPSLFNTSLFDSLPPFGAHHTEAATGEWDEVQSGLRAADAPPPT
AvrBs3    SPAFSAGSFSDLLRQFDPSLFNTSLFDSLPPFGAHHTEAATGEWDEVQSGLRAADAPPPT
AvrXa7    SPAFSAGSFSDLLRQFDPSLLDTSLLDSMPAVGTPHTAAAPAEWDEVQSGLRAADDPPPT
AvrXa10   SPAFSAGSFSDLLRQFDPSLLDTSLLDSMPAVGTPHTAAAPAECDEVQSGLRAADDPPPT
          ******.*************::***:**:*..*: ** **..* *********** ****

Hax3      MRVAVTAARPPRAKPAPRRRAAQPSDASPAAQVDLRTLGYSQQQQEKIKPKVRSTVAQHH
AvrBs3    MRVAVTAARPPRAKPAPRRRAAQPSDASPAAQVDLRTLGYSQQQQEKIKPKVRSTVAQHH
AvrXa7    VRVAVTAARPPRAKPAPRRRAAQPSDASPAAQVDLRTLGYSQQQQEKIKPKVRSTVAQHH
AvrXa10   VRVAVTAR-PPRAKPAPRRRAAQPSDASPAAQVDLRTLGYSQQQQEKIKPKVRSTVAQHH
          :******  ***************************************************

Hax3      EALVGHGFTHAHIVALSQHPAALGTVAVKYQDMIAALPEATHEAIVGVGKQWSGARALEA
AvrBs3    EALVGHGFTHAHIVALSQHPAALGTVAVKYQDMIAALPEATHEAIVGVGKQWSGARALEA
AvrXa7    EALVGHGFTHAHIVALSQHPAALGTVAVKYQHIITALPEATHEDIVGVGKQWSGARALEA
AvrXa10   EALVGHGFTHAHIVALSQHPAALGTVAVTYQDIIRALPEATHEDIVGVGKQWSGARALEA
          ****************************.**.:* ******* ****************

Hax3      LLTVAGELRGPPLQLDTGQLLKIAKRGGVTAVEAVHAWRNALTGAPLN
AvrBs3    LLTVAGELRGPPLQLDTGQLLKIAKRGGVTAVEAVHAWRNALTGAPLN
AvrXa7    LLTEARELRGPPLQLDTGQLLKIAKRGGVTAVEAVHAWRNALTGAPLN
AvrXa10   LLTEAGELRGPPLQLDTGQLLKIAKRGGVTAVEAVHAWRNALTGAPLN
          *** * ******************************************
```

Fig. 9

SEQ ID NO:10 mdpirsrtpsparellpgpqpdrvqptadrggappaggpldglparrtmsrtrlpsppap-
spafsagsfsdllrqfdpslldtslldsmpavgtphtaaapaewd-
evqsglraaddppptvrvavtaarpprakpap-
rrraaqpsdaspaaqvdlrtl<u>gysqqqekikpkvrstvaqh-
healvqhqfthahivalsqhpaalgtvavkyqhiitalpeathedivgvgkqwsgara-
lealltearelrgpplqldtgqllkiakrggvtaveavhawrnaltqapln</u>ltpdqvvaias-
niggkqaletvqrllpvlcqdhgltpdqvvaiashgggkqaletvqrllpvlcqdhglt-
pdqvvaiasniggkqaletvqrllpvlcqahgltpdqvvaiasniggkqaletvqrll-
pvlcqdhgltpaqvvaiasnsggkqaletvqrllpvlcqdhgltpdqvvaiashdggkqal-
etvqrllpvlcqdhgltpdqvvaiannnggkqaletlqrllpvlcqdhglt-
pdqvvaiashdggkqaletvqrllpvlcqdhgltpdqvvaiashdggkqaletvqrll-
pvlcqdhgltpaqvvaiashdggkqaletvqrllpvlcqdhgltpdqvvaiasnsggkqal-
etvqrllpvlcqdhgltpdqvvaiasnggkqaletvqrllpvlcqdhglt-
pdqvvaiasnggkqaletvqrllpvqrllpvlcqdhgltqdqvvaiashdggkqal-
etvqrllpvlcqdhgltpdqvvaiashdggkqaletvqrllpvlcqdhglt-
pdqvvaiasnsggkqaletvqrllpvlcqdhgltpdqvvaiasnsggkqaletvqrll-
pvlcqdhgltpdqvvaiasnnggkqaletvqrllpvlcqdhgltpdqvvaiannnggkqal-
etvqrllpvlcqdhgltpaqvvaiasniggkqaletvqrllpvlcqdhglt-
ldqvvaiasnggskqaletvqrllpvlcqdhgltpdqvvaiannnggkqaletvqrll-
pvlcqdhgltpdqvvaiasniggkqaletvqrllpvlcqdhgltldqvvaiasnggkqal-
etvqrllpvlcqdhgltpnqvvaiasnsggkqaletvqrllpvlcqdhglt-
pnqvvaiasnggkqalesivaqlsrpdpalaaltndhlvalaclggrpaldavkkglphape-
lirrinrripertshrvpdlah-
vvrvlgffqshshpaqafddamtqfemsrhglvqlfrrvgvtelearggtlppasqrw-
drilqasgmkrakpsptsaqtpdqaslhafadslerdldapspm-
hegdqtgassrkrsrsdra-
vtgpsaqqsfevrvpeqrdalhlplswrvkrprtrigggglpdpgtpiaadlaas-
stvmweqdaapfagaadd<u>fpafneeelawlmellpqsqsvgqti</u>

<u>T3S 1-152</u>

<u>-3 repeat</u>

<u>-2 repeat</u>

<u>-1 repeat</u>

<u>T0 255-288</u>

Regular repeats 289-1141

Half repeat 1143-1155

NLS: 1340-1345 and 1376-1380

<u>AD 1421-1446</u>

Fig. 10 a) Amino acid sequence RTP13341, TALE995 (SEQ ID NO: 1)

maypydvpdyaypydvpdyaypydvpdya<u>mdpirsrtpsparellpgpqpdrvqptadrggap-</u>
<u>paggpldglparrtmsrtrlpsppapspafsagsfsdllrqfdpslldtslldsmpavgtph-</u>
<u>taaapaewdevqsglraaddppptvrvavtaarpprakpap-</u>
<u>rrraaqpsdaspaaqvdlrtlgysqqqqekikpkvrstvaqh-</u>
<u>healvghgfthahivalsqhpaalgtvavkyqhiitalpeathedivgvgkqwsgara-</u>
<u>lealltkagelrgpplq</u>ldtgqllkiakrggvtaveavhawrnaltgaplnltpeqvvaiasnsggkqalrlfsgccrfsakhtv*

TS3 type 3 secretion signal
T0 repeat b) TALE995 without HA-tag and unnatural amino acids as result of frameshift (SEQ ID NO: 7)

<u>mdpirsrtpsparellpgpqpdrvqptadrggappaggpldglparrtmsrtrlpsppap-</u>
<u>spafsagsfsdllrqfdpslldtslldsmpavgtphtaaapaewd-</u>
<u>evqsglraaddppptvrvavtaarpprakpap-</u>
<u>rrraaqpsdaspaaqvdlrtlgysqqqqekikpkvrstvaqh-</u>
<u>healvghgfthahivalsqhpaalgtvavkyqhiitalpeathedivgvgkqwsgara-</u>
<u>lealltkagelrgpplq</u>ldtgqllkiakrggvtaveavhawrnaltgaplnltpeqvvaiasnsggkqal TS3 type 3 secretion signal
T0 repeat

Fig. 11 a) Amino acid sequence RTP13336 (SEQ ID NO: 2)
maypydvpdyaypydvpdyaypydvpdyamdpirsrtpsparellpgpqpdrvqptadrggap-
paggpldglparrtmsrtrlpsppapspafsagsfsdllrqfdpslldtslldsmpavgtph-
taaapaewdevqsglraaddppptvrvavtaarpprakpap-
rrraaqpsdaspaaqvdlrtlgysqqqqekikpkvrstvaqh-
healvghgfthahivalsqhpaalgtvavkyqhiitalpeathedivgvgkqwsgara-
lealltkagelrgpplqldtgqllkiakrggvtaveavhawrnaltgaplnlt-
peqvvaiasnsggkqaletvqrllpvlcqahgltpeqvvaiasniggkqaletvqrll-
pvlcqahgltpeqvvaiasngggkqaletvqrllpvlcqahgltpeqvvaiashdggkqal-
etvqrllpvlcqahgltpeqvvaiasngggkqaletvqrllpvlcqahglt-
peqvvaiasnkggkqaletvqrllpvlcqahgltpeqvvaiasnsggkqaletvqrll-
pvlcqahgltpeqvvaiasniggkqawrrysacfpsfakltg*

TS3 type 3 secretion signal
T0 repeat b) RTP13336 without HA-tag and unnatural amino acids as result of frameshift (SEQ ID NO: 8)

mdpirsrtpsparellpgpqpdrvqptadrggappaggpldglparrtmsrtrlpsppap-
spafsagsfsdllrqfdpslldtslldsmpavgtphtaaapaewd-
evqsglraaddppptvrvavtaarpprakpap-
rrraaqpsdaspaaqvdlrtlgysqqqqekikpkvrstvaqh-
healvghgfthahivalsqhpaalgtvavkyqhiitalpeathedivgvgkqwsgara-
lealltkagelrgpplqldtgqllkiakrggvtaveavhawrnaltgaplnlt-
peqvvaiasnsggkqaletvqrllpvlcqahgltpeqvvaiasniggkqaletvqrll-
pvlcqahgltpeqvvaiasngggkqaletvqrllpvlcqahgltpeqvvaiashdggkqal-
etvqrllpvlcqahgltpeqvvaiasngggkqaletvqrllpvlcqahglt-
peqvvaiasnkggkqaletvqrllpvlcqahgltpeqvvaiasnsggkqaletvqrllpvlcqahgltpeqvvaiasniggkqa TS3 type 3 secretion signal
T0 repeat

Fig. 12 a) Amino acid sequence RTP13346 (SEQ ID NO: 3)

maypydvpdyaypydvpdyaypydvpdyamdpirsrtpsparellpgpqpdrvqptadrggap-
paggpldglparrtmsrtrlpsppapspafsagsfsdllrqfdpslldtslldsmpavgtph-
taaapaewdevqsglraaddppptvrvavtaarpprakpap-
rrraaqpsdaspaaqvdlrtlgysqqqekikpkvrstvaqh-
healvghgfthahivalsqhpaalgtvavkyqhiitalpeathedivgvgkqwsgara-
lealltkagelrgpplqldtgqllkiakrggvtaveavhawrnaltgaplnlt-
peqvvaiasnsggkqaletvqrllpvlcqahgltpeqvvaiasniggkqaletvqrll-
pvlcqahgltpeqvvaiasngggkqaletvqrllpvlcqahgltpeqvvaiasngggkqal-
etvqrllpvlcqahgltpeqvvaiasngggkqalkrssvcslssvrhtv TS3 type 3 secretion signal
T0 repeat b) RTP13346 without HA-tag and unnatural amino acids as result of frameshift (SEQ ID NO: 9)

mdpirsrtpsparellpgpqpdrvqptadrggappaggpldglparrtmsrtrlpsppap-
spafsagsfsdllrqfdpslldtslldsmpavgtphtaaapaewd-
evqsglraaddppptvrvavtaarpprakpap-
rrraaqpsdaspaaqvdlrtlgysqqqekikpkvrstvaqh-
healvghgfthahivalsqhpaalgtvavkyqhiitalpeathedivgvgkqwsgara-
lealltkagelrgpplqldtgqllkiakrggvtaveavhawrnaltgaplnlt-
peqvvaiasnsggkqaletvqrllpvlcqahgltpeqvvaiasniggkqaletvqrll-
pvlcqahgltpeqvvaiasngggkqaletvqrllpvlcqahgltpeqvvaiasngggkqal-
etvqrllpvlcqahgltpeqvvaiasngggkqal TS3 type 3 secretion signal
T0 repeat

SEQUENCE LISTING

<160> NUMBER OF SEQ ID NOS: 23

<210> SEQ ID NO 1
<211> LENGTH: 351
<212> TYPE: PRT
<213> ORGANISM: Artificial Sequence
<220> FEATURE:
<223> OTHER INFORMATION: Amino acid sequence RTP13341, TALE995

<400> SEQUENCE: 1

Met Ala Tyr Pro Tyr Asp Val Pro Asp Tyr Ala Tyr Pro Tyr Asp Val
1               5                   10                  15

Pro Asp Tyr Ala Tyr Pro Tyr Asp Val Pro Asp Tyr Ala Met Asp Pro
            20                  25                  30

Ile Arg Ser Arg Thr Pro Ser Pro Ala Arg Glu Leu Leu Pro Gly Pro
        35                  40                  45

Gln Pro Asp Arg Val Gln Pro Thr Ala Asp Arg Gly Gly Ala Pro Pro
    50                  55                  60

Ala Gly Gly Pro Leu Asp Gly Leu Pro Ala Arg Arg Thr Met Ser Arg
65                  70                  75                  80

Thr Arg Leu Pro Ser Pro Pro Ala Pro Ser Pro Ala Phe Ser Ala Gly

```
                85                  90                  95
Ser Phe Ser Asp Leu Leu Arg Gln Phe Asp Pro Ser Leu Leu Asp Thr
            100                 105                 110
Ser Leu Leu Asp Ser Met Pro Ala Val Gly Thr Pro His Thr Ala Ala
            115                 120                 125
Ala Pro Ala Glu Trp Asp Glu Val Gln Ser Gly Leu Arg Ala Ala Asp
            130                 135                 140
Asp Pro Pro Pro Thr Val Arg Val Ala Val Thr Ala Ala Arg Pro Pro
145                 150                 155                 160
Arg Ala Lys Pro Ala Pro Arg Arg Ala Ala Gln Pro Ser Asp Ala
                165                 170                 175
Ser Pro Ala Ala Gln Val Asp Leu Arg Thr Leu Gly Tyr Ser Gln Gln
                180                 185                 190
Gln Gln Glu Lys Ile Lys Pro Lys Val Arg Ser Thr Val Ala Gln His
            195                 200                 205
His Glu Ala Leu Val Gly His Gly Phe Thr His Ala His Ile Val Ala
            210                 215                 220
Leu Ser Gln His Pro Ala Ala Leu Gly Thr Val Ala Val Lys Tyr Gln
225                 230                 235                 240
His Ile Ile Thr Ala Leu Pro Glu Ala Thr His Glu Asp Ile Val Gly
                245                 250                 255
Val Gly Lys Gln Trp Ser Gly Ala Arg Ala Leu Glu Ala Leu Leu Thr
                260                 265                 270
Lys Ala Gly Glu Leu Arg Gly Pro Pro Leu Gln Leu Asp Thr Gly Gln
            275                 280                 285
Leu Leu Lys Ile Ala Lys Arg Gly Gly Val Thr Ala Val Glu Ala Val
            290                 295                 300
His Ala Trp Arg Asn Ala Leu Thr Gly Ala Pro Leu Asn Leu Thr Pro
305                 310                 315                 320
Glu Gln Val Val Ala Ile Ala Ser Asn Ser Gly Gly Lys Gln Ala Leu
                325                 330                 335
Arg Leu Phe Ser Gly Cys Cys Arg Phe Ser Ala Lys His Thr Val
            340                 345                 350

<210> SEQ ID NO 2
<211> LENGTH: 589
<212> TYPE: PRT
<213> ORGANISM: Artificial Sequence
<220> FEATURE:
<223> OTHER INFORMATION: Amino acid sequence RTP13336

<400> SEQUENCE: 2

Met Ala Tyr Pro Tyr Asp Val Pro Asp Tyr Ala Tyr Pro Tyr Asp Val
1               5                   10                  15
Pro Asp Tyr Ala Tyr Pro Tyr Asp Val Pro Asp Tyr Ala Met Asp Pro
                20                  25                  30
Ile Arg Ser Arg Thr Pro Ser Pro Ala Arg Glu Leu Leu Pro Gly Pro
            35                  40                  45
Gln Pro Asp Arg Val Gln Pro Thr Ala Asp Arg Gly Ala Pro Pro
    50                  55                  60
Ala Gly Gly Pro Leu Asp Gly Leu Pro Ala Arg Arg Thr Met Ser Arg
65                  70                  75                  80
Thr Arg Leu Pro Ser Pro Pro Ala Pro Ser Pro Ala Phe Ser Ala Gly
                85                  90                  95
Ser Phe Ser Asp Leu Leu Arg Gln Phe Asp Pro Ser Leu Leu Asp Thr
```

```
                100             105             110
Ser Leu Leu Asp Ser Met Pro Ala Val Gly Thr Pro His Thr Ala Ala
            115             120             125

Ala Pro Ala Glu Trp Asp Glu Val Gln Ser Gly Leu Arg Ala Ala Asp
            130             135             140

Asp Pro Pro Thr Val Arg Val Ala Val Thr Ala Ala Arg Pro Pro
145             150             155             160

Arg Ala Lys Pro Ala Pro Arg Arg Ala Ala Gln Pro Ser Asp Ala
            165             170             175

Ser Pro Ala Ala Gln Val Asp Leu Arg Thr Leu Gly Tyr Ser Gln Gln
            180             185             190

Gln Gln Glu Lys Ile Lys Pro Lys Val Arg Ser Thr Val Ala Gln His
            195             200             205

His Glu Ala Leu Val Gly His Gly Phe Thr His Ala His Ile Val Ala
            210             215             220

Leu Ser Gln His Pro Ala Ala Leu Gly Thr Val Ala Val Lys Tyr Gln
225             230             235             240

His Ile Ile Thr Ala Leu Pro Glu Ala Thr His Glu Asp Ile Val Gly
            245             250             255

Val Gly Lys Gln Trp Ser Gly Ala Arg Ala Leu Glu Ala Leu Leu Thr
            260             265             270

Lys Ala Gly Glu Leu Arg Gly Pro Pro Leu Gln Leu Asp Thr Gly Gln
            275             280             285

Leu Leu Lys Ile Ala Lys Arg Gly Gly Val Thr Ala Val Glu Ala Val
            290             295             300

His Ala Trp Arg Asn Ala Leu Thr Gly Ala Pro Leu Asn Leu Thr Pro
305             310             315             320

Glu Gln Val Val Ala Ile Ala Ser Asn Ser Gly Gly Lys Gln Ala Leu
            325             330             335

Glu Thr Val Gln Arg Leu Leu Pro Val Leu Cys Gln Ala His Gly Leu
            340             345             350

Thr Pro Glu Gln Val Val Ala Ile Ala Ser Asn Ile Gly Gly Lys Gln
            355             360             365

Ala Leu Glu Thr Val Gln Arg Leu Leu Pro Val Leu Cys Gln Ala His
            370             375             380

Gly Leu Thr Pro Glu Gln Val Ala Ile Ala Ser Asn Gly Gly Gly
385             390             395             400

Lys Gln Ala Leu Glu Thr Val Gln Arg Leu Leu Pro Val Leu Cys Gln
            405             410             415

Ala His Gly Leu Thr Pro Glu Gln Val Val Ala Ile Ala Ser His Asp
            420             425             430

Gly Gly Lys Gln Ala Leu Glu Thr Val Gln Arg Leu Leu Pro Val Leu
            435             440             445

Cys Gln Ala His Gly Leu Thr Pro Glu Gln Val Val Ala Ile Ala Ser
            450             455             460

Asn Gly Gly Gly Lys Gln Ala Leu Glu Thr Val Gln Arg Leu Leu Pro
465             470             475             480

Val Leu Cys Gln Ala His Gly Leu Thr Pro Glu Gln Val Val Ala Ile
            485             490             495

Ala Ser Asn Lys Gly Gly Lys Gln Ala Leu Glu Thr Val Gln Arg Leu
            500             505             510

Leu Pro Val Leu Cys Gln Ala His Gly Leu Thr Pro Glu Gln Val Val
            515             520             525
```

```
Ala Ile Ala Ser Asn Ser Gly Gly Lys Gln Ala Leu Glu Thr Val Gln
            530                 535                 540

Arg Leu Leu Pro Val Leu Cys Gln Ala His Gly Leu Thr Pro Glu Gln
545                 550                 555                 560

Val Val Ala Ile Ala Ser Asn Ile Gly Gly Lys Gln Ala Trp Arg Arg
                565                 570                 575

Tyr Ser Ala Cys Phe Pro Ser Phe Ala Lys Leu Thr Gly
            580                 585

<210> SEQ ID NO 3
<211> LENGTH: 487
<212> TYPE: PRT
<213> ORGANISM: Artificial Sequence
<220> FEATURE:
<223> OTHER INFORMATION: Amino acid sequence RTP13346

<400> SEQUENCE: 3

Met Ala Tyr Pro Tyr Asp Val Pro Asp Tyr Ala Pro Tyr Asp Val
1               5                   10                  15

Pro Asp Tyr Ala Tyr Pro Tyr Asp Val Pro Tyr Ala Met Asp Pro
            20                  25                  30

Ile Arg Ser Arg Thr Pro Ser Pro Ala Arg Glu Leu Leu Pro Gly Pro
            35                  40                  45

Gln Pro Asp Arg Val Gln Pro Thr Ala Asp Arg Gly Gly Ala Pro Pro
50                  55                  60

Ala Gly Gly Pro Leu Asp Gly Leu Pro Ala Arg Arg Thr Met Ser Arg
65                  70                  75                  80

Thr Arg Leu Pro Ser Pro Pro Ala Pro Ser Pro Ala Phe Ser Ala Gly
                85                  90                  95

Ser Phe Ser Asp Leu Leu Arg Gln Phe Asp Pro Ser Leu Leu Asp Thr
            100                 105                 110

Ser Leu Leu Asp Ser Met Pro Ala Val Gly Thr Pro His Thr Ala Ala
            115                 120                 125

Ala Pro Ala Glu Trp Asp Glu Val Gln Ser Gly Leu Arg Ala Ala Asp
            130                 135                 140

Asp Pro Pro Pro Thr Val Arg Val Ala Val Thr Ala Ala Arg Pro Pro
145                 150                 155                 160

Arg Ala Lys Pro Ala Pro Arg Arg Ala Ala Gln Pro Ser Asp Ala
                165                 170                 175

Ser Pro Ala Ala Gln Val Asp Leu Arg Thr Leu Gly Tyr Ser Gln Gln
            180                 185                 190

Gln Gln Glu Lys Ile Lys Pro Lys Val Arg Ser Thr Val Ala Gln His
            195                 200                 205

His Glu Ala Leu Val Gly His Gly Phe Thr His Ala His Ile Val Ala
            210                 215                 220

Leu Ser Gln His Pro Ala Ala Leu Gly Thr Val Ala Val Lys Tyr Gln
225                 230                 235                 240

His Ile Ile Thr Ala Leu Pro Glu Ala Thr His Glu Asp Ile Val Gly
            245                 250                 255

Val Gly Lys Gln Trp Ser Gly Ala Arg Ala Leu Glu Ala Leu Leu Thr
            260                 265                 270

Lys Ala Gly Glu Leu Arg Gly Pro Pro Leu Gln Leu Asp Thr Gly Gln
            275                 280                 285

Leu Leu Lys Ile Ala Lys Arg Gly Gly Val Thr Ala Val Glu Ala Val
            290                 295                 300
```

```
His Ala Trp Arg Asn Ala Leu Thr Gly Ala Pro Leu Asn Leu Thr Pro
305                 310                 315                 320

Glu Gln Val Val Ala Ile Ala Ser Asn Ser Gly Gly Lys Gln Ala Leu
            325                 330                 335

Glu Thr Val Gln Arg Leu Leu Pro Val Leu Cys Gln Ala His Gly Leu
        340                 345                 350

Thr Pro Glu Gln Val Val Ala Ile Ala Ser Asn Ile Gly Gly Lys Gln
    355                 360                 365

Ala Leu Glu Thr Val Gln Arg Leu Leu Pro Val Leu Cys Gln Ala His
370                 375                 380

Gly Leu Thr Pro Glu Gln Val Val Ala Ile Ala Ser Asn Gly Gly Gly
385                 390                 395                 400

Lys Gln Ala Leu Glu Thr Val Gln Arg Leu Leu Pro Val Leu Cys Gln
            405                 410                 415

Ala His Gly Leu Thr Pro Glu Gln Val Val Ala Ile Ala Ser Asn Gly
        420                 425                 430

Gly Gly Lys Gln Ala Leu Glu Thr Val Gln Arg Leu Leu Pro Val Leu
    435                 440                 445

Cys Gln Ala His Gly Leu Thr Pro Glu Gln Val Val Ala Ile Ala Ser
450                 455                 460

Asn Gly Gly Gly Lys Gln Ala Leu Lys Arg Ser Ser Val Cys Ser Leu
465                 470                 475                 480

Ser Ser Val Arg His Thr Val
                485

<210> SEQ ID NO 4
<211> LENGTH: 2978
<212> TYPE: DNA
<213> ORGANISM: Artificial Sequence
<220> FEATURE:
<223> OTHER INFORMATION: CDS RTP13341

<400> SEQUENCE: 4
atggcttacc cgtacgacgt gcctgactac gcctacccct tacgacgtacc cgactacgcc      60 tatccttacg acgttcccga ctacgccatg gacccgatcc gatcccgtac cccgtccccg     120
gcccgggagt tgctgccggg tccgcaacct gatagggtac aacccaccgc cgataggggt     180
ggcgcaccac ctgccggagg cccacttgac gggttgcccg cacgaaggta agtttctgct     240 tctaccttg atatatatat aataattatc attaattagt agtaatataa tatttcaaat      300 attttttca aaataaaaga atgtagtata tagcaattgc ttttctgtag tttataagtg      360
tgtatatttt aatttataac ttttctaata tatgaccaaa atttgttgat gtgcaggaca     420
atgtcaagga cccggctgcc ttcgccaccg gctccaagcc cagccttcag tgccggatcc     480
ttctcggact tgctccgtca gttcgaccct ccctcctgg acacctccct actggactcg      540
atgcctgccg tgggaacccc tcacacagcc gcagctcccg cagagtggga cgaagtgcaa     600
tccggcctga gagccgctga cgacccccg cctaccgtga gggtagccgt aaccgccgca      660
agacctccga gggcaaagcc tgcaccaagg cgaagggctg cccaaccttc tgacgcctca     720
ccggctgccc aagtggacct gcgaacactg ggctactccc aacagcagca agagaagatc     780
aagccgaagg tccgaagcac cgtggcccaa caccacgagg ccctagtggg tcacggcttt     840
acccacgccc atatcgtggc cctctcccaa caccgggcg cgctaggcac agttgccgtg      900
aagtaccagc atattatcac cgctctgcct gaggccaccc acgaggatat cgttggcgtc     960
```

-continued

```
gggaagcagt ggagcggagc ccgagcactc gaagctctac tgaccaaggc tggcgagctg    1020
aggggtcctc cgctacagct agacaccggc cagcttctga agatcgcaaa gcgtggcgga    1080
gtgaccgccg tcgaagcggt tcacgcgtgg cgcaacgcct tgactggtgc accgctgaac    1140
ctgaccccgg agcaagtcgt agcgatcgct tccaactcgg gagggaaaca ggccctgaga    1200
ctgttcagcg gttgctgccg gttctctgcc aagcacacgg tttgactccc gagcaagtgg    1260
ttgctatcgc gtccaacgga ggagggaagc aagccctgga aacggttcaa aggctgcttc    1320
ccgtcctctg tcaagctcac ggacttacgc cggagcaagt ggttgcaatt gctagcaaca    1380
aaggcggcaa gcaagcccta gaaaccgtcc aaaggctcct tcccgttctc tgccaagctc    1440
acggtttgac accggagcaa gtggtggcta tagcgtccaa tattggcggg aagcaagccc    1500
tcgagactgt tcagcggttg ctgccggttc tctgccaagc acacggtttg actcccgagc    1560
aagtggttgc tatcgcgtcc aacggaggag gaagcaagc cctcgagact gttcagcggt    1620
tgctgccggt tctctgccaa gcacacggtt tgactcccga gcaagtggtt gctatcgcgt    1680
ccaacggagg agggaagcaa gccctagaaa ccgtccaaag gctccttccc gttctctgcc    1740
aagctcacgg tttgacaccg gagcaagtgg tggctatagc gtccaatatt ggcgggaagc    1800
aagcccttga cagttcag cgcttgcttc ccgttctgtg ccaagcacac ggtcttaccc     1860
ctgagcaagt ggtcgcgata gcttcgcacg acggtgggaa gcaagccctg gaaacggttc    1920
aaaggctgct tcccgtcctc tgtcaagctc acggacttac gccggagcaa gtggttgcaa    1980
ttgctagcaa caaaggcggc aagcaagccc tggagacggt acagcgcttg cttcccgtcc    2040
tttgccaagc tcacgggctg acacccgagc aagtcgtggc tatcgcgtct aactccggcg    2100
ggaaacaggc gctggagtcg atcgtcgctc aactgagccg tccggaccct gcactggctg    2160
ccttgaccaa cgaccacctg gtagccctcg cctgcctggg cggacgaccg cgctggacg    2220 cggtgaagaa ggggctccca cacgcaccgg agctgatccg ccggattaat cgccggatac    2280
cggagaggac ctctcaccga gtgccggacc tggctcacgt agtccgagtg ctgggcttct    2340
tccaaagcca ctcccaccct gcacaagcct cgacgacgc gatgacccag ttcgagatgt    2400
cacgacacgg cctggtgcaa ctgttccgac gggtaggcgt gacggaattc gaagcgcgct    2460
acggcacact gccaccggcc tcccagaggt gggataggat actgcaagcc tccggtatga    2520
agcgagccaa gccgtcaccg acttccgctc agacgccgga tcaggcctcc ctccacgcct    2580 tgccgactc cctggagagg gacctggacg ccccgagccc tatgcacgaa ggagaccaga    2640
cccgtgcctc ctcgaggaag aggtccaggt ctgatagggc tgtaaccggc ccgagcaccc    2700
agcagagctt cgaagtgagg gtgccggaac agcaagacgc cctgcacctg cctctgtcct    2760
ggcgcgtgaa gaggccaagg acccgtatag gcggcggact gccagatcct ggaaccccga    2820
tcgcagccga tctagctgcg agctcaaccg tgatgtggga gcaagacgct gcaccgtttg    2880
ctggcgctgc cgacgatttc cccgccttca cgaggaaga gttggcctgg ctgatggagc    2940
tgcttccgca atccggctcc gtaggtggaa caatttga                            2978
```

<210> SEQ ID NO 5
<211> LENGTH: 2876
<212> TYPE: DNA
<213> ORGANISM: Artificial Sequence
<220> FEATURE:
<223> OTHER INFORMATION: CDS RTP13336

<400> SEQUENCE: 5

```
atggcttacc cgtacgacgt gcctgactac gcctacccgt acgacgtacc cgactacgcc     60
```

-continued

```
tatccttacg acgttcccga ctacgccatg gacccgatcc gatcccgtac cccgtccccg    120
gcccgggagt tgctgccggg tccgcaacct gatagggtac aacccaccgc cgataggggt    180
ggcgcaccac ctgccggagg cccacttgac gggttgcccg cacgaaggta agtttctgct    240
tctacctttg atatatatat aataattatc attaattagt agtaatataa tatttcaaat    300
atttttttca aaataaaaga atgtagtata tagcaattgc ttttctgtag tttataagtg    360
tgtatatttt aatttataac ttttctaata tatgaccaaa atttgttgat gtgcaggaca    420
atgtcaagga cccggctgcc ttcgccaccg gctccaagcc cagccttcag tgccggatcc    480
ttctcggact tgctccgtca gttcgacccct tccctcctgg acacctccct actggactcg    540
atgcctgccg tgggaacccc tcacacagcc gcagctcccg cagagtggga cgaagtgcaa    600
tccggcctga gagccgctga cgaccccccg cctaccgtga gggtagccgt aaccgccgca    660
agacctccga gggcaaagcc tgcaccaagg cgaagggctg cccaaccttc tgacgcctca    720
ccggctgccc aagtggacct gcgaacactg ggctactccc aacagcagca agagaagatc    780
aagccgaagg tccgaagcac cgtggcccaa caccacgagg ccctagtggg tcacggcttt    840
acccacgccc atatcgtggc cctctcccaa caccgccg cgctaggcac agttgccgtg    900
aagtaccagc atattatcac cgctctgcct gaggccaccc acgaggatat cgttggcgtc    960
gggaagcagt ggagcggagc ccgagcactc gaagctctac tgaccaaggc tggcgagctg   1020
aggggtcctc cgctacagct agacaccggc cagcttctga agatcgcaaa gcgtggcgga   1080
gtgaccgccg tcgaagcggt tcacgcgtgg cgcaacgcct tgactggtgc accgctgaac   1140
ctgaccccgg agcaagtcgt agcgatcgct tccaactcgg gagggaaaca ggccctagaa   1200
accgtccaaa ggctccttcc cgttctctgc caagctcacg gtttgacacc ggagcaagtg   1260
gtggctatag cgtccaatat tggcgggaag caagccctcg agactgttca gcggttgctg   1320
ccggttctct gccaagcaca cggtttgact cccgagcaag tggttgctat cgcgtccaac   1380
ggaggaggga agcaagccct tgagacagtt cagcgcttgc ttcccgttct gtgccaagca   1440
cacggtctta cccctgagca agtggtcgcg atagcttcgc acgacggtgg gaagcaagcc   1500
ctcgagactg ttcagcggtt gctgccggtt ctctgccaag cacacggttt gactcccgag   1560
caagtggttg ctatcgcgtc caacggagga gggaagcaag ccctggaaac ggttcaaagg   1620
ctgcttcccg tcctctgtca agctcacgga cttacgccgg agcaagtggt tgcaattgct   1680
agcaacaaag gcggcaagca agcccttgaa acggtccagc gtctgctccc tgtcctctgt   1740
caggcacacg gtctgacccc tgagcaagtg gtggctatcg cgagcaattc gggaggcaaa   1800
caagccctag aaaccgtcca aaggctcctt cccgttctct gccaagctca cggtttgaca   1860
ccggagcaag tggtggctat agcgtccaat attggcggga gcaagcctg agacggtac    1920 agcgcttgct tcccgtccct tgccaagctc acgggctgac acccgagcaa gtcgtggcta   1980
tcgcgtctaa ctccggcggg aaacaggcgc tggagtcgat cgtcgctcaa ctgagccgtc   2040
cggaccctgc actggctgcc ttgaccaacg accacctggt agccctcgcc tgcctgggcg   2100
gacgaccggc gctggacgcg gtgaagaagg ggctcccaca cgcaccggag ctgatccgcc   2160
ggattaatcg ccgataccg gagaggacct ctcaccgagt gccggacctg gctcacgtag    2220
tccgagtgct gggcttcttc caaagccact cccaccctgc acaagccttc gacgacgcga   2280
tgacccagtt cgagatgtca cgacacgcc tggtgcaact gttccgacgg gtaggcgtga    2340
cggaattcga agcgcgctac ggcacactgc caccggcctc ccagaggtgg gataggatac   2400
```

```
tgcaagcctc cggtatgaag cgagccaagc cgtcaccgac ttccgctcag acgccggatc    2460
aggcctccct ccacgccttt gccgactccc tggagaggga cctggacgcc ccgagcccta    2520
tgcacgaagg agaccagacc cgtgcctcct cgaggaagag gtccaggtct gatagggctg    2580
taaccggccc gagcacccag cagagcttcg aagtgagggt gccggaacag caagacgccc    2640
tgcacctgcc tctgtcctgg cgcgtgaaga ggccaaggac ccgtataggc ggcggactgc    2700
cagatcctgg aacccgatcg cagccgatct agctgcgagc tcaaccgtg atgtgggagc     2760 aagacgctgc accgtttgct ggcgctgccg acgatttccc cgccttcaac gaggaagagt    2820
tggcctggct gatggagctg cttccgcaat ccggctccgt aggtggaaca atttga        2876
```

<210> SEQ ID NO 6
<211> LENGTH: 3080
<212> TYPE: DNA
<213> ORGANISM: Artificial Sequence
<220> FEATURE:
<223> OTHER INFORMATION: CDS RTP13346

<400> SEQUENCE: 6

```
atggcttacc cgtacgacgt gcctgactac gcctacccct tacgacgtacc cgactacgcc    60 tatccttacg acgttcccga ctacgccatg gacccgatcc gatcccgtac cccgtccccg    120
gcccgggagt tgctgccggg tccgcaacct gatagggtac aacccaccgc cgatagggggt    180 ggcgcaccac ctgccggagg cccacttgac ggggttgcccg cacgaaggta agtttctgct    240
tctacctttg atatatatat aataattatc attaattagt agtaatataa tatttcaaat    300 attttttttca aaataaaaga atgtagtata tagcaattgc ttttctgtag tttataagtg    360
tgtatatttt aatttataac ttttctaata tatgaccaaa atttgttgat gtgcaggaca    420
atgtcaagga cccggctgcc ttcgccaccg gctccaagcc cagccttcag tgccggatcc    480
ttctcggact tgctccgtca gttcgaccct ccctcctgg acacctccct actggactcg    540
atgcctgccg tgggaacccc tcacacagcc gcagctcccg cagagtggga cgaagtgcaa    600
tccggcctga gaccgctga cgaccccccg cctaccgtga gggtagccgt aaccgccgca    660
agacctccga gggcaaagcc tgcaccaagg cgaagggctg cccaaccttc tgacgcctca    720
ccggctgccc aagtggacct gcgaacactg ggctactccc aacagcagca agagaagatc    780
aagccgaagg tccgaagcac cgtggcccaa caccacgagg ccctagtggg tcacggcttt    840
acccacgccc atatcgtggc cctctcccaa caccggccg cgctaggcac agttgccgtg    900
aagtaccagc atattatcac cgctctgcct gaggccaccc acgaggatat cgttggcgtc    960
gggaagcagt ggagcggagc ccgagcactc gaagctctac tgaccaaggc tggcgagctg    1020 agggtcctc cgctacagct agacaccggc cagcttctga gatcgcaaa gcgtggcgga    1080 gtgaccgccg tcgaagcggt tcacgcgtgg cgcaacgcct tgactggtgc accgctgaac    1140
ctgaccccgg agcaagtcgt agcgatcgct tccaactcgg gagggaaaca ggcccctagaa    1200 accgtccaaa ggctccttcc cgttctctgc caagctcacg gtttgacacc ggagcaagtg    1260
gtggctatag cgtccaatat tggcgggaag caagccctcg agactgttca gcggttgctg    1320
ccggttctct gccaagcaca cggtttgact cccgagcaag tggttgctat cgcgtccaac    1380
ggaggaggga agcaagccct cgagactgtt cagcggttgc tgccggttct ctgccaagca    1440
cacggtttga ctcccgagca agtggttgct atcgcgtcca acggaggagg gaagcaagcc    1500
ctcgagactt ttcagcggtt gctgccggtt ctctgccaag cacacggttt gactcccgag    1560
caagtggttg ctatcgcgtc caacggagga gggaagcaag ccctgaaacg gtccagcgtc    1620
```

-continued

```
tgctccctgt cctctgtcag gcacacggtc tgacccctga gcaagtggtg gctatcgcga    1680
gcaattcggg aggcaaacaa gccctcgaga ctgttcagcg gttgctgccg gttctctgcc    1740
aagcacacgg tttgactccc gagcaagtgg ttgctatcgc gtccaacgga ggagggaagc    1800
aagccctgga aacggttcaa aggctgcttc ccgtcctctg tcaagctcac ggacttacgc    1860
cggagcaagt ggttgcaatt gctagcaaca aaggcggcaa gcaagccctg gaaacggttc    1920
aaaggctgct tcccgtcctc tgtcaagctc acggacttac gccggagcaa gtggttgcaa    1980
ttgctagcaa caaaggcggc aagcaagccc tggaaacggt tcaaaggctg cttcccgtcc    2040
tctgtcaagc tcacggactt acgccggagc aagtggttgc aattgctagc aacaaaggcg    2100
gcaagcaagc cctggagacg gtacagcgct tgcttcccgt cctttgccaa gctcacgggc    2160
tgacacccga gcaagtcgtg gctatcgcgt ctaactccgg cgggaaacag cgctggagt    2220 cgatcgtcgc tcaactgagc cgtccggacc ctgcactggc tgccttgacc aacgaccacc    2280
tggtagccct cgcctgcctg gcggacgac cggcgtgga cgcggtgaag aaggggctcc    2340
cacacgcacc ggagctgatc cgccggatta atcgccggat accggagagg acctctcacc    2400
gagtgccgga cctggctcac gtagtccgag tgctgggctt cttccaaagc cactcccacc    2460
ctgcacaagc cttcgacgac gcgatgaccc agttcgagat gtcacgacac ggcctggtgc    2520
aactgttccg acgggtaggc gtgacggaat cgaagcgcg ctacggcaca ctgccaccgg    2580
cctcccagag gtgggatagg atactgcaag cctccggtat gaagcgagcc aagccgtcac    2640
cgacttccgc tcagacgccg gatcaggcct ccctccacgc ctttgccgac tccctggaga    2700
gggacctgga cgcccccgagc cctatgcacg aaggagacca gacccgtgcc tcctcgagga    2760
agaggtccag gtctgatagg gctgtaaccg gcccgagcac ccagcagagc ttcgaagtga    2820
gggtgccgga acagcaagac gccctgcacc tgcctctgtc ctggcgcgtg aagaggccaa    2880
ggacccgtat aggcggcgga ctgccagatc ctggaacccc gatcgcagcc gatctagctg    2940
cgagctcaac cgtgatgtgg gagcaagacg ctgcaccgtt tgctggcgct gccgacgatt    3000
tccccgcctt caacgaggaa gagttggcct ggctgatgga gctgcttccg caatccggct    3060
ccgtaggtgg aacaatttga                                                3080
```

<210> SEQ ID NO 7
<211> LENGTH: 307
<212> TYPE: PRT
<213> ORGANISM: Artificial Sequence
<220> FEATURE:
<223> OTHER INFORMATION: RTP13341 without HA TAG and unnatural amino
     acids

<400> SEQUENCE: 7

```
Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
        35                  40                  45

Met Ser Arg Thr Arg Leu Pro Ser Pro Ala Pro Ser Pro Ala Phe
    50                  55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95
```

Thr Ala Ala Ala Pro Ala Glu Trp Asp Glu Val Gln Ser Gly Leu Arg
            100                 105                 110

Ala Ala Asp Asp Pro Pro Thr Val Arg Val Ala Val Thr Ala Ala
            115                 120                 125

Arg Pro Pro Arg Ala Lys Pro Ala Pro Arg Arg Arg Ala Ala Gln Pro
130                 135                 140

Ser Asp Ala Ser Pro Ala Ala Gln Val Asp Leu Arg Thr Leu Gly Tyr
145                 150                 155                 160

Ser Gln Gln Gln Glu Lys Ile Lys Pro Lys Val Arg Ser Thr Val
            165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
            195                 200                 205

Lys Tyr Gln His Ile Ile Thr Ala Leu Pro Glu Ala Thr His Glu Asp
210                 215                 220

Ile Val Gly Val Gly Lys Gln Trp Ser Gly Ala Arg Ala Leu Glu Ala
225                 230                 235                 240

Leu Leu Thr Lys Ala Gly Glu Leu Arg Gly Pro Pro Leu Gln Leu Asp
            245                 250                 255

Thr Gly Gln Leu Leu Lys Ile Ala Lys Arg Gly Gly Val Thr Ala Val
            260                 265                 270

Glu Ala Val His Ala Trp Arg Asn Ala Leu Thr Gly Ala Pro Leu Asn
            275                 280                 285

Leu Thr Pro Glu Gln Val Val Ala Ile Ala Ser Asn Ser Gly Gly Lys
290                 295                 300

Gln Ala Leu
305

<210> SEQ ID NO 8
<211> LENGTH: 544
<212> TYPE: PRT
<213> ORGANISM: Artificial Sequence
<220> FEATURE:
<223> OTHER INFORMATION: RTP13336 without HA TAG and unnatural amino
      acids

<400> SEQUENCE: 8

Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
            35                  40                  45

Met Ser Arg Thr Arg Leu Pro Ser Pro Pro Ala Pro Ser Pro Ala Phe
50                  55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
            85                  90                  95

Thr Ala Ala Ala Pro Ala Glu Trp Asp Glu Val Gln Ser Gly Leu Arg
            100                 105                 110

Ala Ala Asp Asp Pro Pro Thr Val Arg Val Ala Val Thr Ala Ala
            115                 120                 125

Arg Pro Pro Arg Ala Lys Pro Ala Pro Arg Arg Arg Ala Ala Gln Pro

```
            130                 135                 140
Ser Asp Ala Ser Pro Ala Ala Gln Val Asp Leu Arg Thr Leu Gly Tyr
145                 150                 155                 160

Ser Gln Gln Gln Glu Lys Ile Lys Pro Lys Val Arg Ser Thr Val
                165                 170                 175

Ala Gln His His Glu Ala Leu Val Gly His Gly Phe Thr His Ala His
                180                 185                 190

Ile Val Ala Leu Ser Gln His Pro Ala Ala Leu Gly Thr Val Ala Val
                195                 200                 205

Lys Tyr Gln His Ile Ile Thr Ala Leu Pro Glu Ala Thr His Glu Asp
                210                 215                 220

Ile Val Gly Val Gly Lys Gln Trp Ser Gly Ala Arg Ala Leu Glu Ala
225                 230                 235                 240

Leu Leu Thr Lys Ala Gly Glu Leu Arg Gly Pro Pro Leu Gln Leu Asp
                245                 250                 255

Thr Gly Gln Leu Leu Lys Ile Ala Lys Arg Gly Gly Val Thr Ala Val
                260                 265                 270

Glu Ala Val His Ala Trp Arg Asn Ala Leu Thr Gly Ala Pro Leu Asn
                275                 280                 285

Leu Thr Pro Glu Gln Val Val Ala Ile Ala Ser Asn Ser Gly Gly Lys
                290                 295                 300

Gln Ala Leu Glu Thr Val Gln Arg Leu Leu Pro Val Leu Cys Gln Ala
305                 310                 315                 320

His Gly Leu Thr Pro Glu Gln Val Val Ala Ile Ala Ser Asn Ile Gly
                325                 330                 335

Gly Lys Gln Ala Leu Glu Thr Val Gln Arg Leu Leu Pro Val Leu Cys
                340                 345                 350

Gln Ala His Gly Leu Thr Pro Glu Gln Val Val Ala Ile Ala Ser Asn
                355                 360                 365

Gly Gly Gly Lys Gln Ala Leu Glu Thr Val Gln Arg Leu Leu Pro Val
                370                 375                 380

Leu Cys Gln Ala His Gly Leu Thr Pro Glu Gln Val Val Ala Ile Ala
385                 390                 395                 400

Ser His Asp Gly Gly Lys Gln Ala Leu Glu Thr Val Gln Arg Leu Leu
                405                 410                 415

Pro Val Leu Cys Gln Ala His Gly Leu Thr Pro Glu Gln Val Val Ala
                420                 425                 430

Ile Ala Ser Asn Gly Gly Gly Lys Gln Ala Leu Glu Thr Val Gln Arg
                435                 440                 445

Leu Leu Pro Val Leu Cys Gln Ala His Gly Leu Thr Pro Glu Gln Val
450                 455                 460

Val Ala Ile Ala Ser Asn Lys Gly Gly Lys Gln Ala Leu Glu Thr Val
465                 470                 475                 480

Gln Arg Leu Leu Pro Val Leu Cys Gln Ala His Gly Leu Thr Pro Glu
                485                 490                 495

Gln Val Val Ala Ile Ala Ser Asn Ser Gly Gly Lys Gln Ala Leu Glu
                500                 505                 510

Thr Val Gln Arg Leu Leu Pro Val Leu Cys Gln Ala His Gly Leu Thr
                515                 520                 525

Pro Glu Gln Val Val Ala Ile Ala Ser Asn Ile Gly Gly Lys Gln Ala
                530                 535                 540
```

<210> SEQ ID NO 9

```
<211> LENGTH: 443
<212> TYPE: PRT
<213> ORGANISM: Artificial Sequence
<220> FEATURE:
<223> OTHER INFORMATION: RTP13346 without HA TAG and unnatural amino
      acids

<400> SEQUENCE: 9
```

```
Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
        35                  40                  45

Met Ser Arg Thr Arg Leu Pro Ser Pro Pro Ala Pro Ser Pro Ala Phe
50                  55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95

Thr Ala Ala Ala Pro Ala Glu Trp Asp Glu Val Gln Ser Gly Leu Arg
            100                 105                 110

Ala Ala Asp Asp Pro Pro Pro Thr Val Arg Val Ala Val Thr Ala Ala
        115                 120                 125

Arg Pro Pro Arg Ala Lys Pro Ala Pro Arg Arg Arg Ala Ala Gln Pro
130                 135                 140

Ser Asp Ala Ser Pro Ala Ala Gln Val Asp Leu Arg Thr Leu Gly Tyr
145                 150                 155                 160

Ser Gln Gln Gln Gln Glu Lys Ile Lys Pro Lys Val Arg Ser Thr Val
                165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
        195                 200                 205

Lys Tyr Gln His Ile Ile Thr Ala Leu Pro Glu Ala Thr His Glu Asp
210                 215                 220

Ile Val Gly Val Gly Lys Gln Trp Ser Gly Ala Arg Ala Leu Glu Ala
225                 230                 235                 240

Leu Leu Thr Lys Ala Gly Glu Leu Arg Gly Pro Pro Leu Gln Leu Asp
                245                 250                 255

Thr Gly Gln Leu Leu Lys Ile Ala Lys Arg Gly Gly Val Thr Ala Val
            260                 265                 270

Glu Ala Val His Ala Trp Arg Asn Ala Leu Thr Gly Ala Pro Leu Asn
        275                 280                 285

Leu Thr Pro Glu Gln Val Val Ala Ile Ala Ser Asn Ser Gly Gly Lys
290                 295                 300

Gln Ala Leu Glu Thr Val Gln Arg Leu Leu Pro Val Leu Cys Gln Ala
305                 310                 315                 320

His Gly Leu Thr Pro Glu Gln Val Val Ala Ile Ala Ser Asn Ile Gly
                325                 330                 335

Gly Lys Gln Ala Leu Glu Thr Val Gln Arg Leu Leu Pro Val Leu Cys
            340                 345                 350

Gln Ala His Gly Leu Thr Pro Glu Gln Val Val Ala Ile Ala Ser Asn
        355                 360                 365

Gly Gly Gly Lys Gln Ala Leu Glu Thr Val Gln Arg Leu Leu Pro Val
```

```
                370                 375                 380
Leu Cys Gln Ala His Gly Leu Thr Pro Glu Gln Val Ala Ile Ala
385                 390                 395                 400

Ser Asn Gly Gly Gly Lys Gln Ala Leu Glu Thr Val Gln Arg Leu Leu
                405                 410                 415

Pro Val Leu Cys Gln Ala His Gly Leu Thr Pro Glu Gln Val Val Ala
            420                 425                 430

Ile Ala Ser Asn Gly Gly Gly Lys Gln Ala Leu
        435                 440
```

<210> SEQ ID NO 10
<211> LENGTH: 1446
<212> TYPE: PRT
<213> ORGANISM: Artificial Sequence
<220> FEATURE:
<223> OTHER INFORMATION: Amino acid sequence of AvrXa7

<400> SEQUENCE: 10

```
Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
                20                  25                  30

Ala Pro Pro Ala Gly Gly Pro Leu Asp Gly Leu Pro Ala Arg Arg Thr
            35                  40                  45

Met Ser Arg Thr Arg Leu Pro Ser Pro Pro Ala Pro Ser Pro Ala Phe
    50                  55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95

Thr Ala Ala Ala Pro Ala Glu Trp Asp Glu Val Gln Ser Gly Leu Arg
            100                 105                 110

Ala Ala Asp Asp Pro Pro Pro Thr Val Arg Val Ala Val Thr Ala Ala
        115                 120                 125

Arg Pro Pro Arg Ala Lys Pro Ala Pro Arg Arg Arg Ala Ala Gln Pro
130                 135                 140

Ser Asp Ala Ser Pro Ala Ala Gln Val Asp Leu Arg Thr Leu Gly Tyr
145                 150                 155                 160

Ser Gln Gln Gln Gln Glu Lys Ile Lys Pro Lys Val Arg Ser Thr Val
                165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
        195                 200                 205

Lys Tyr Gln His Ile Ile Thr Ala Leu Pro Glu Ala Thr His Glu Asp
210                 215                 220

Ile Val Gly Val Gly Lys Gln Trp Ser Gly Ala Arg Ala Leu Glu Ala
225                 230                 235                 240

Leu Leu Thr Glu Ala Arg Glu Leu Arg Gly Pro Pro Leu Gln Leu Asp
                245                 250                 255

Thr Gly Gln Leu Leu Lys Ile Ala Lys Arg Gly Gly Val Thr Ala Val
            260                 265                 270

Glu Ala Val His Ala Trp Arg Asn Ala Leu Thr Gly Ala Pro Leu Asn
        275                 280                 285

Leu Thr Pro Asp Gln Val Val Ala Ile Ala Ser Asn Ile Gly Gly Lys
```

```
                290                 295                 300
Gln Ala Leu Glu Thr Val Gln Arg Leu Leu Pro Val Leu Cys Gln Asp
305                 310                 315                 320

His Gly Leu Thr Pro Asp Gln Val Val Ala Ile Ala Ser His Gly Gly
                325                 330                 335

Gly Lys Gln Ala Leu Glu Thr Val Gln Arg Leu Leu Pro Val Leu Cys
                340                 345                 350

Gln Asp His Gly Leu Thr Pro Asp Gln Val Val Ala Ile Ala Ser Asn
                355                 360                 365

Ile Gly Gly Lys Gln Ala Leu Glu Thr Val Gln Arg Leu Leu Pro Val
                370                 375                 380

Leu Cys Gln Ala His Gly Leu Thr Pro Asp Gln Val Val Ala Ile Ala
385                 390                 395                 400

Ser Asn Ile Gly Gly Lys Gln Ala Leu Glu Thr Val Gln Arg Leu Leu
                405                 410                 415

Pro Val Leu Cys Gln Asp His Gly Leu Thr Pro Ala Gln Val Val Ala
                420                 425                 430

Ile Ala Ser Asn Ser Gly Gly Lys Gln Ala Leu Glu Thr Val Gln Arg
                435                 440                 445

Leu Leu Pro Val Leu Cys Gln Asp His Gly Leu Thr Pro Asp Gln Val
                450                 455                 460

Val Ala Ile Ala Ser His Asp Gly Gly Lys Gln Ala Leu Glu Thr Val
465                 470                 475                 480

Gln Arg Leu Leu Pro Val Leu Cys Gln Asp His Gly Leu Thr Pro Asp
                485                 490                 495

Gln Val Val Ala Ile Ala Asn Asn Gly Gly Lys Gln Ala Leu Glu
                500                 505                 510

Thr Leu Gln Arg Leu Leu Pro Val Leu Cys Gln Asp His Gly Leu Thr
                515                 520                 525

Pro Asp Gln Val Val Ala Ile Ala Ser His Asp Gly Gly Lys Gln Ala
                530                 535                 540

Leu Glu Thr Val Gln Arg Leu Leu Pro Val Leu Cys Gln Asp His Gly
545                 550                 555                 560

Leu Thr Pro Asp Gln Val Val Ala Ile Ala Ser His Asp Gly Gly Lys
                565                 570                 575

Gln Ala Leu Glu Thr Val Gln Arg Leu Leu Pro Val Leu Cys Gln Asp
                580                 585                 590

His Gly Leu Thr Pro Ala Gln Val Val Ala Ile Ala Ser His Asp Gly
                595                 600                 605

Gly Lys Gln Ala Leu Glu Thr Val Gln Arg Leu Leu Pro Val Leu Cys
                610                 615                 620

Gln Asp His Gly Leu Thr Pro Asp Gln Val Val Ala Ile Ala Ser Asn
625                 630                 635                 640

Ser Gly Gly Lys Gln Ala Leu Glu Thr Val Gln Arg Leu Leu Pro Val
                645                 650                 655

Leu Cys Gln Asp His Gly Leu Thr Pro Asp Gln Val Val Ala Ile Ala
                660                 665                 670

Ser Asn Gly Gly Lys Gln Ala Leu Glu Thr Val Gln Arg Leu Leu Pro
                675                 680                 685

Val Leu Cys Gln Asp His Gly Leu Thr Pro Asp Gln Val Val Ala Ile
                690                 695                 700

Ala Ser Asn Gly Gly Lys Gln Ala Leu Glu Thr Val Gln Arg Leu Leu
705                 710                 715                 720
```

```
Pro Val Gln Arg Leu Leu Pro Val Leu Cys Gln Asp His Gly Leu Thr
            725                 730                 735

Gln Asp Gln Val Val Ala Ile Ala Ser His Asp Gly Gly Lys Gln Ala
            740                 745                 750

Leu Glu Thr Val Gln Arg Leu Leu Pro Val Leu Cys Gln Asp His Gly
            755                 760                 765

Leu Thr Pro Asp Gln Val Val Ala Ile Ala Ser His Asp Gly Gly Lys
    770                 775                 780

Gln Ala Leu Glu Thr Val Gln Arg Leu Leu Pro Val Leu Cys Gln Asp
785                 790                 795                 800

His Gly Leu Thr Pro Asp Gln Val Val Ala Ile Ala Ser Asn Ser Gly
            805                 810                 815

Gly Lys Gln Ala Leu Glu Thr Val Gln Arg Leu Leu Pro Val Leu Cys
            820                 825                 830

Gln Asp His Gly Leu Thr Pro Asp Gln Val Val Ala Ile Ala Ser Asn
            835                 840                 845

Ser Gly Gly Lys Gln Ala Leu Glu Thr Val Gln Arg Leu Leu Pro Val
    850                 855                 860

Leu Cys Gln Asp His Gly Leu Thr Pro Asp Gln Val Val Ala Ile Ala
865                 870                 875                 880

Ser Asn Asn Gly Gly Lys Gln Ala Leu Glu Thr Val Gln Arg Leu Leu
            885                 890                 895

Pro Val Leu Cys Gln Asp His Gly Leu Thr Pro Asp Gln Val Val Ala
            900                 905                 910

Ile Ala Asn Asn Asn Gly Gly Lys Gln Ala Leu Glu Thr Val Gln Arg
            915                 920                 925

Leu Leu Pro Val Leu Cys Gln Asp His Gly Leu Thr Pro Ala Gln Val
    930                 935                 940

Val Ala Ile Ala Ser Asn Ile Gly Gly Lys Gln Ala Leu Glu Thr Val
945                 950                 955                 960

Gln Arg Leu Leu Pro Val Leu Cys Gln Asp His Gly Leu Thr Leu Asp
            965                 970                 975

Gln Val Val Ala Ile Ala Ser Asn Gly Gly Ser Lys Gln Ala Leu Glu
            980                 985                 990

Thr Val Gln Arg Leu Leu Pro Val Leu Cys Gln Asp His Gly Leu Thr
    995                 1000                1005

Pro Asp Gln Val Val Ala Ile Ala Asn Asn Asn Gly Gly Lys Gln
    1010            1015                1020

Ala Leu Glu Thr Val Gln Arg Leu Leu Pro Val Leu Cys Gln Asp
    1025            1030                1035

His Gly Leu Thr Pro Asp Gln Val Val Ala Ile Ala Ser Asn Ile
    1040            1045                1050

Gly Gly Lys Gln Ala Leu Glu Thr Val Gln Arg Leu Leu Pro Val
    1055            1060                1065

Leu Cys Gln Asp His Gly Leu Thr Leu Asp Gln Val Val Ala Ile
    1070            1075                1080

Ala Ser Asn Gly Gly Lys Gln Ala Leu Glu Thr Val Gln Arg Leu
    1085            1090                1095

Leu Pro Val Leu Cys Gln Asp His Gly Leu Thr Pro Asn Gln Val
    1100            1105                1110

Val Ala Ile Ala Ser Asn Ser Gly Gly Lys Gln Ala Leu Glu Thr
    1115            1120                1125
```

| | | | | | | | | | | |
|---|---|---|---|---|---|---|---|---|---|---|
|Val|Gln|Arg|Leu|Leu|Pro|Val|Leu|Cys|Gln|Asp|His|Gly|Leu|Thr|
|1130| | | | |1135| | | | |1140| | | | |

Pro Asn Gln Val Val Ala Ile Ala Ser Asn Gly Gly Lys Gln Ala
1145                1150                1155

Leu Glu Ser Ile Val Ala Gln Leu Ser Arg Pro Asp Pro Ala Leu
1160                1165                1170

Ala Ala Leu Thr Asn Asp His Leu Val Ala Leu Ala Cys Leu Gly
1175                1180                1185

Gly Arg Pro Ala Leu Asp Ala Val Lys Lys Gly Leu Pro His Ala
1190                1195                1200

Pro Glu Leu Ile Arg Arg Ile Asn Arg Arg Ile Pro Glu Arg Thr
1205                1210                1215

Ser His Arg Val Pro Asp Leu Ala His Val Val Arg Val Leu Gly
1220                1225                1230

Phe Phe Gln Ser His Ser His Pro Ala Gln Ala Phe Asp Asp Ala
1235                1240                1245

Met Thr Gln Phe Glu Met Ser Arg His Gly Leu Val Gln Leu Phe
1250                1255                1260

Arg Arg Val Gly Val Thr Glu Leu Glu Ala Arg Gly Gly Thr Leu
1265                1270                1275

Pro Pro Ala Ser Gln Arg Trp Asp Arg Ile Leu Gln Ala Ser Gly
1280                1285                1290

Met Lys Arg Ala Lys Pro Ser Pro Thr Ser Ala Gln Thr Pro Asp
1295                1300                1305

Gln Ala Ser Leu His Ala Phe Ala Asp Ser Leu Glu Arg Asp Leu
1310                1315                1320

Asp Ala Pro Ser Pro Met His Glu Gly Asp Gln Thr Gly Ala Ser
1325                1330                1335

Ser Arg Lys Arg Ser Arg Ser Asp Arg Ala Val Thr Gly Pro Ser
1340                1345                1350

Ala Gln Gln Ser Phe Glu Val Arg Val Pro Glu Gln Arg Asp Ala
1355                1360                1365

Leu His Leu Pro Leu Ser Trp Arg Val Lys Arg Pro Arg Thr Arg
1370                1375                1380

Ile Gly Gly Gly Leu Pro Asp Pro Gly Thr Pro Ile Ala Ala Asp
1385                1390                1395

Leu Ala Ala Ser Ser Thr Val Met Trp Glu Gln Asp Ala Ala Pro
1400                1405                1410

Phe Ala Gly Ala Ala Asp Asp Phe Pro Ala Phe Asn Glu Glu Glu
1415                1420                1425

Leu Ala Trp Leu Met Glu Leu Leu Pro Gln Ser Gly Ser Val Gly
1430                1435                1440

Gly Thr Ile
1445

<210> SEQ ID NO 11
<211> LENGTH: 9
<212> TYPE: PRT
<213> ORGANISM: Artificial Sequence
<220> FEATURE:
<223> OTHER INFORMATION: Amino acid sequence, 1xHA tag

<400> SEQUENCE: 11

Tyr Pro Tyr Asp Val Pro Asp Tyr Ala
1               5

<210> SEQ ID NO 12
<211> LENGTH: 27
<212> TYPE: PRT
<213> ORGANISM: Artificial Sequence
<220> FEATURE:
<223> OTHER INFORMATION: Amino acid sequence, 3xHA tag

<400> SEQUENCE: 12

```
Tyr Pro Tyr Asp Val Pro Asp Tyr Ala Tyr Pro Tyr Asp Val Pro Asp
1               5                   10                  15

Tyr Ala Tyr Pro Tyr Asp Val Pro Asp Tyr Ala
            20                  25
```

<210> SEQ ID NO 13
<211> LENGTH: 81
<212> TYPE: DNA
<213> ORGANISM: Artificial Sequence
<220> FEATURE:
<223> OTHER INFORMATION: nucleic acid sequence, 3xHA tag

<400> SEQUENCE: 13

```
tacccgtacg acgtgcctga ctacgcctac ccttacgacg tacccgacta cgcctatcct      60
tacgacgttc ccgactacgc c                                                81
```

<210> SEQ ID NO 14
<211> LENGTH: 15
<212> TYPE: PRT
<213> ORGANISM: Artificial Sequence
<220> FEATURE:
<223> OTHER INFORMATION: sequence added by frameshift, mentioned in
      Example 1

<400> SEQUENCE: 14

```
Arg Leu Phe Ser Gly Cys Cys Arg Phe Ser Ala Lys His Thr Val
1               5                   10                  15
```

<210> SEQ ID NO 15
<211> LENGTH: 11
<212> TYPE: PRT
<213> ORGANISM: Artificial Sequence
<220> FEATURE:
<223> OTHER INFORMATION: Sequence in Figure 1

<400> SEQUENCE: 15

```
Thr Asn Ala Cys Gly Cys Gly Gly Gly Ala Asn
1               5                   10
```

<210> SEQ ID NO 16
<211> LENGTH: 9
<212> TYPE: PRT
<213> ORGANISM: Artificial Sequence
<220> FEATURE:
<223> OTHER INFORMATION: Sequence in Figure 1

<400> SEQUENCE: 16

```
Thr Asn Ala Thr Cys Thr Gly Asn Ala
1               5
```

<210> SEQ ID NO 17
<211> LENGTH: 152
<212> TYPE: PRT
<213> ORGANISM: Artificial Sequence
<220> FEATURE:
<223> OTHER INFORMATION: T3S and translocation signal

<400> SEQUENCE: 17

Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
        35                  40                  45

Met Ser Arg Thr Arg Leu Pro Ser Pro Pro Ala Pro Ser Pro Ala Phe
50                      55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95

Thr Ala Ala Ala Pro Ala Glu Trp Asp Glu Val Gln Ser Gly Leu Arg
            100                 105                 110

Ala Ala Asp Asp Pro Pro Thr Val Arg Val Ala Val Thr Ala Ala
        115                 120                 125

Arg Pro Pro Arg Ala Lys Pro Ala Pro Arg Arg Ala Ala Gln Pro
130                 135                 140

Ser Asp Ala Ser Pro Ala Ala Gln
145                 150

<210> SEQ ID NO 18
<211> LENGTH: 287
<212> TYPE: PRT
<213> ORGANISM: Artificial Sequence
<220> FEATURE:
<223> OTHER INFORMATION: AvrXa10 partial sequence from Figure 8

<400> SEQUENCE: 18

Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
        35                  40                  45

Met Ser Arg Thr Arg Leu Pro Ser Pro Pro Ala Pro Ser Pro Ala Phe
50                      55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95

Thr Ala Ala Ala Pro Ala Glu Cys Asp Glu Val Gln Ser Gly Leu Arg
            100                 105                 110

Ala Ala Asp Asp Pro Pro Thr Val Arg Val Ala Val Thr Ala Arg
        115                 120                 125

Pro Pro Arg Ala Lys Pro Ala Pro Arg Arg Ala Ala Gln Pro Ser
130                 135                 140

Asp Ala Ser Pro Ala Ala Gln Val Asp Leu Arg Thr Leu Gly Tyr Ser
145                 150                 155                 160

Gln Gln Gln Gln Glu Lys Ile Lys Pro Lys Val Arg Ser Thr Val Ala
                165                 170                 175

Gln His His Glu Ala Leu Val Gly His Gly Phe Thr His Ala His Ile
            180                 185                 190

Val Ala Leu Ser Gln His Pro Ala Ala Leu Gly Thr Val Ala Val Thr
        195                 200                 205

Tyr Gln Asp Ile Ile Arg Ala Leu Pro Glu Ala Thr His Glu Asp Ile
        210                 215                 220

Val Gly Val Gly Lys Gln Trp Ser Gly Ala Arg Ala Leu Glu Ala Leu
225                 230                 235                 240

Leu Thr Glu Ala Gly Glu Leu Arg Gly Pro Pro Leu Gln Leu Asp Thr
                245                 250                 255

Gly Gln Leu Leu Lys Ile Ala Lys Arg Gly Gly Val Thr Ala Val Glu
            260                 265                 270

Ala Val His Ala Trp Arg Asn Ala Leu Thr Gly Ala Pro Leu Asn
        275                 280                 285

<210> SEQ ID NO 19
<211> LENGTH: 288
<212> TYPE: PRT
<213> ORGANISM: Artificial Sequence
<220> FEATURE:
<223> OTHER INFORMATION: AvrXa7, partial sequence from Figure 8

<400> SEQUENCE: 19

Met Asp Pro Ile Arg Ser Arg Thr Pro Ser Pro Ala Arg Glu Leu Leu
1               5                   10                  15

Pro Gly Pro Gln Pro Asp Arg Val Gln Pro Thr Ala Asp Arg Gly Gly
            20                  25                  30

Ala Pro Pro Ala Gly Gly Pro Leu Asp Gly Leu Pro Ala Arg Arg Thr
        35                  40                  45

Met Ser Arg Thr Arg Leu Pro Ser Pro Pro Ala Pro Ser Pro Ala Phe
    50                  55                  60

Ser Ala Gly Ser Phe Ser Asp Leu Leu Arg Gln Phe Asp Pro Ser Leu
65                  70                  75                  80

Leu Asp Thr Ser Leu Leu Asp Ser Met Pro Ala Val Gly Thr Pro His
                85                  90                  95

Thr Ala Ala Ala Pro Ala Glu Trp Asp Glu Val Gln Ser Gly Leu Arg
            100                 105                 110

Ala Ala Asp Asp Pro Pro Pro Thr Val Arg Val Ala Val Thr Ala Ala
        115                 120                 125

Arg Pro Pro Arg Ala Lys Pro Ala Pro Arg Arg Arg Ala Ala Gln Pro
    130                 135                 140

Ser Asp Ala Ser Pro Ala Ala Gln Val Asp Leu Arg Thr Leu Gly Tyr
145                 150                 155                 160

Ser Gln Gln Gln Gln Glu Lys Ile Lys Pro Lys Val Arg Ser Thr Val
                165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
        195                 200                 205

Lys Tyr Gln His Ile Ile Thr Ala Leu Pro Glu Ala Thr His Glu Asp
    210                 215                 220

Ile Val Gly Val Gly Lys Gln Trp Ser Gly Ala Arg Ala Leu Glu Ala
225                 230                 235                 240

Leu Leu Thr Glu Ala Arg Glu Leu Arg Gly Pro Pro Leu Gln Leu Asp
                245                 250                 255

Thr Gly Gln Leu Leu Lys Ile Ala Lys Arg Gly Gly Val Thr Ala Val
            260                 265                 270

Glu Ala Val His Ala Trp Arg Asn Ala Leu Thr Gly Ala Pro Leu Asn
        275                 280                 285

<210> SEQ ID NO 20
<211> LENGTH: 288
<212> TYPE: PRT
<213> ORGANISM: Artificial Sequence
<220> FEATURE:
<223> OTHER INFORMATION: AvrBs3, partial sequence from Figure 8

<400> SEQUENCE: 20

Met Asp Pro Ile Arg Ser Arg Thr Pro Ser Pro Ala Arg Glu Leu Leu
1               5                   10                  15

Pro Gly Pro Gln Pro Asp Gly Val Gln Pro Thr Ala Asp Arg Gly Val
            20                  25                  30

Ser Pro Pro Ala Gly Gly Pro Leu Asp Gly Leu Pro Ala Arg Arg Thr
        35                  40                  45

Met Ser Arg Thr Arg Leu Pro Ser Pro Ala Pro Ser Pro Ala Phe
    50                  55                  60

Ser Ala Gly Ser Phe Ser Asp Leu Leu Arg Gln Phe Asp Pro Ser Leu
65                  70                  75                  80

Phe Asn Thr Ser Leu Phe Asp Ser Leu Pro Pro Phe Gly Ala His His
                85                  90                  95

Thr Glu Ala Ala Thr Gly Glu Trp Asp Glu Val Gln Ser Gly Leu Arg
            100                 105                 110

Ala Ala Asp Ala Pro Pro Pro Thr Met Arg Val Ala Val Thr Ala Ala
        115                 120                 125

Arg Pro Pro Arg Ala Lys Pro Ala Pro Arg Arg Arg Ala Ala Gln Pro
    130                 135                 140

Ser Asp Ala Ser Pro Ala Ala Gln Val Asp Leu Arg Thr Leu Gly Tyr
145                 150                 155                 160

Ser Gln Gln Gln Gln Glu Lys Ile Lys Pro Lys Val Arg Ser Thr Val
                165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
        195                 200                 205

Lys Tyr Gln Asp Met Ile Ala Ala Leu Pro Glu Ala Thr His Glu Ala
    210                 215                 220

Ile Val Gly Val Gly Lys Gln Trp Ser Gly Ala Arg Ala Leu Glu Ala
225                 230                 235                 240

Leu Leu Thr Val Ala Gly Glu Leu Arg Gly Pro Pro Leu Gln Leu Asp
                245                 250                 255

Thr Gly Gln Leu Leu Lys Ile Ala Lys Arg Gly Gly Val Thr Ala Val
            260                 265                 270

Glu Ala Val His Ala Trp Arg Asn Ala Leu Thr Gly Ala Pro Leu Asn
        275                 280                 285

<210> SEQ ID NO 21
<211> LENGTH: 288
<212> TYPE: PRT
<213> ORGANISM: Artificial Sequence
<220> FEATURE:
<223> OTHER INFORMATION: Hax3, partial sequence from Figure 8

<400> SEQUENCE: 21

Met Asp Pro Ile Arg Ser Arg Thr Pro Ser Pro Ala Arg Glu Leu Leu
1               5                   10                  15

Ser Gly Pro Gln Pro Asp Gly Val Gln Pro Thr Ala Asp Arg Gly Val

```
              20                  25                  30
Ser Pro Pro Ala Gly Gly Pro Leu Asp Gly Leu Pro Ala Arg Arg Thr
         35                  40                  45

Met Ser Arg Thr Arg Leu Pro Ser Pro Ala Pro Ser Pro Ala Phe
 50                  55                  60

Ser Ala Asp Ser Phe Ser Asp Leu Leu Arg Gln Phe Asp Pro Ser Leu
 65                  70                  75                  80

Phe Asn Thr Ser Leu Phe Asp Ser Leu Pro Pro Phe Gly Ala His His
                 85                  90                  95

Thr Glu Ala Ala Thr Gly Glu Trp Asp Glu Val Gln Ser Gly Leu Arg
            100                 105                 110

Ala Ala Asp Ala Pro Pro Thr Met Arg Val Ala Val Thr Ala Ala
            115                 120                 125

Arg Pro Pro Arg Ala Lys Pro Ala Pro Arg Arg Ala Ala Gln Pro
            130                 135                 140

Ser Asp Ala Ser Pro Ala Ala Gln Val Asp Leu Arg Thr Leu Gly Tyr
145                 150                 155                 160

Ser Gln Gln Gln Gln Glu Lys Ile Lys Pro Lys Val Arg Ser Thr Val
                165                 170                 175

Ala Gln His His Glu Ala Leu Val Gly His Gly Phe Thr His Ala His
            180                 185                 190

Ile Val Ala Leu Ser Gln His Pro Ala Ala Leu Gly Thr Val Ala Val
            195                 200                 205

Lys Tyr Gln Asp Met Ile Ala Ala Leu Pro Glu Ala Thr His Glu Ala
            210                 215                 220

Ile Val Gly Val Gly Lys Gln Trp Ser Gly Ala Arg Ala Leu Glu Ala
225                 230                 235                 240

Leu Leu Thr Val Ala Gly Glu Leu Arg Gly Pro Pro Leu Gln Leu Asp
                245                 250                 255

Thr Gly Gln Leu Leu Lys Ile Ala Lys Arg Gly Gly Val Thr Ala Val
                260                 265                 270

Glu Ala Val His Ala Trp Arg Asn Ala Leu Thr Gly Ala Pro Leu Asn
            275                 280                 285

<210> SEQ ID NO 22
<211> LENGTH: 34
<212> TYPE: PRT
<213> ORGANISM: Artificial Sequence
<220> FEATURE:
<223> OTHER INFORMATION: Tandem repeat sequence
<220> FEATURE:
<221> NAME/KEY: VARIANT
<222> LOCATION: (12)..(13)
<223> OTHER INFORMATION: Xaa is any amino acid

<400> SEQUENCE: 22

Leu Thr Pro Asp Gln Val Val Ala Ile Ala Ser Xaa Xaa Gly Gly Lys
1               5                   10                  15

Gln Ala Leu Glu Thr Val Gln Arg Leu Leu Pro Val Leu Cys Gln Asp
            20                  25                  30

His Gly

<210> SEQ ID NO 23
<211> LENGTH: 18
<212> TYPE: PRT
<213> ORGANISM: Artificial Sequence
<220> FEATURE:
<223> OTHER INFORMATION: partial Tandem repeat sequence
```

```
<400> SEQUENCE: 23

Thr Pro Glu Gln Val Val Ala Ile Ala Ser Asn Ser Gly Gly Lys Gln
1               5                   10                  15

Ala Leu
```

INCREASE IN CORN TRANSFORMATION EFFICACY BY THE N-TERMINUS OF A TALE

CROSS-REFERENCE TO RELATED APPLICATIONS

This is the U.S. national phase of International Application No. PCT/EP2020/078451, filed Oct. 9, 2020, which claims priority to European Patent Application No. 19202802.5, filed on Oct. 11, 2019.

INCORPORATION BY REFERENCE OF MATERIAL SUBMITTED ELECTRONICALLY

The Sequence Listing, which is a part of the present disclosure, is submitted concurrently with the specification as a text file. The name of the text file containing the Sequence Listing is "A191294_Seqlisting", which was created on Jan. 26, 2022 and is 62,961 bytes in size. The subject matter of the Sequence Listing is incorporated herein in its entirety by reference.

FIELD OF THE INVENTION

The present invention is in the field of molecular biology and relates to improved methods for plant transformation and to polynucleotides and polypeptides for achieving the same.

BACKGROUND SECTION

Plant transformation is now widely used for basic research as well as for generation of commercially used transgenic crops. Transgenic plants are typically produced by complex methods, for example by Agrobacterium-mediated transformation. Agrobacterium is a naturally occurring pathogenic soil bacterium which is capable of transferring DNA into the genome of plant cells. For Agrobacterium-mediated plant transformation, the gene of interest is placed between the left and right border repeats of Agrobacterium T-DNA (transfer DNA). Afterwards, the T-DNA region containing the gene of interest is stably integrated into the plant genome by using an appropriate plant transformation protocol (for a review see Gelvin, 2003 Microbiol Mol Biol Rev. 67(1): 16-37). Aside from Agrobacterium-mediated plant transformation, other plant transformation methods exist such as viral transformation, electroporation of plant protoplasts, and particle bombardment.

Generally, plant transformation techniques are based on the same principles. In a first step, the gene of interest is introduced in a suitable transformation vector. The transformation vector harboring the gene of interest is then introduced into regenerable cells of a target plant. Since only a minor proportion of target cells receive the gene of interest, selection for transformed plant cells among a large excess of untransformed cells is carried out. Moreover, once the gene of interest has been stably introduced into the genome of a host cell, it is essential to establish regeneration conditions to regenerate whole plants from a single transformed plant cell (see, e.g., Birch, 1997, Annu. Rev. Plant Physiol. Plant Mol. Biol. 48: 297-326).

Regeneration of whole transformed plants is considered as one bottleneck in plant transformation since regeneration is very time-consuming. Transformation procedures that would allow for a faster generation of transgenic plants are, therefore, highly desired. Further, transformation procedures which allow for a higher transformation efficacy are highly desired.

TAL effectors (TALEs) of plant pathogens belonging to the genus of *Xanthomonas* are important virulence factors that bind specific sequences in the plant genome resulting in altered gene expression in the host cell to support bacterial proliferation. DNA-binding is made possible through the central repeat region (abbreviated "CRR"), a central region of polymorphic repeats. This central repeat region consists of multiple, tandemly arranged, ~34 amino acid repeat motifs, which are hypervariable in the amino acids at position 12 and 13 (the Repeat Variable Diresidue or RVD). Each repeat was discovered to bind one bp in a contiguous target sequence in a neighbor-independent manner, with the RVD sequence determining the specificity of binding. The cipher governing the specificity was found to be surprisingly simple: RVD sequence NI-binds A, HD-binds C, NG-binds T, NK-binds G and NS-binds all 4 nucleotides (Scholze and Boch, 2011). The last repeat is only a half repeat, but contains the two hyper-variable residues and can be designed to bind any nucleotide. The C-terminus of TALE contains nuclear localization signals (NLS) and the transcriptional activation domain (AD). A TALE requires the presence of at least 8 units in the DNA binding domain to meet the minimal affinity for transcriptional activation (Boch et al., 2009) and amino acids after the half repeat are required for proper folding of the DNA binding domain (Zhang et al., 2011, Christian et al., 2010, Miller et al., 2011, Mussolino et al., 2011, Sun et al., 2012).

The N-terminal domain of TAL effectors comprises a type III secretion signal and four "cryptic" repeats (repeat −3, repeat −2, repeat −1 and repeat 0) that structurally resemble the central repeats. These cryptic repeats are posited to nucleate binding to DNA. The four cryptic repeats play a less specific but crucial role in the DNA interaction. In general, TALEs demonstrate preference for a thymine (T) nucleotide at the 5′ position immediately preceding the target site. Therefore, repeat 0, i.e. the cryptic repeat immediately before the first repeat of the CRR is frequently also referred to as T0 repeat (Read et al., 2016, Triplett et al., 2016).

Schornack et al. showed that truncated TALEs (AvrBs4 type) triggers HR (hypersensitive response) mediated by Bs4 in tomato. When delivered through Agrobacterium the truncated some, but not all truncated TALEs triggered Bs4 dependent HR as did the full length AvrBs4 (see FIG. 1 of Schornack). The tested truncated TALEs lacked a complete CDR domain and the entire CTR which includes the NLSs and AD. In another paper, Schornack et al. (2005) showed that Bs4 expression is constitutive regardless of the presence of Xanthomonas.

Triplett et al. (2016) showed that truncated TALEs also induce HR in rice. However, truncated TALEs with a CRR having 0.5, 1.5 and 2.5 repeats did induce HR.

Read et al. (2016) showed that truncated TALEs suppress resistance mediated by the Xo1 locus.

Ji et al. (2016) show that two truncated TALE effectors, Tal3a and Tal3b interfere with Xa1-mediated resistance in rice.

Although significant advances have been made in the field of transformation methods, a need continues to exist for improved methods to facilitate the ease, speed and efficiency of such methods for transformation of plants. Therefore, it was the objective of the present invention to provide an improved method having higher overall efficiency in the process of generation of transgenic plants. This objective is solved by the present invention.

Surprisingly, it was shown in the studies underlying the present invention that introduction of a truncated transcription activator-like effector (TALE) polypeptide allows for a general improvement of transformation. The truncated TALE polypeptide comprises the N-terminus of a TALE polypeptide. In particular, the introduction allowed for an enhanced transformation efficacy, a faster growth of transformed calli, a faster generation of TO plants. Further, an increased biomass of generated TO plants was observed. Advantageously, in the T1 generation plants appeared to develop normally. The transformation efficacy was increased more than 2 fold over controls and plants were moved to the greenhouse 3 weeks earlier. The observed effect was independent of nuclear localization and transcriptional activation as both corresponding domains are not functionally present in the truncated protein.

BRIEF SUMMARY OF THE PRESENT INVENTION

The present invention relates to method for generating a transgenic plant comprising at least one polynucleotide of interest, the method comprising
(a) providing
  (i) a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain, and/or
  (ii) a polynucleotide encoding the truncated transcription activator-like effector (TALE) polypeptide of (i), or the functional variant thereof,
(b) providing at least one polynucleotide of interest,
(c) introducing the polypeptide or polynucleotide provided in step (a), and the at least one polynucleotide of interest provided in step (b) into a plant cell, and
(d) regenerating a transgenic plant comprising the at least one polynucleotide of interest from said plant cell.

In an embodiment of the aforementioned method, the method comprises the steps of
(a) providing a polynucleotide encoding a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain,
(b) providing at least one polynucleotide of interest,
(c) introducing polynucleotide provided in step (a), and the at least one polynucleotide of interest provided in step (b) into a plant cell, and
(d) regenerating a transgenic plant comprising the at least one polynucleotide of interest from said plant cell.

In an embodiment of the aforementioned methods, the polynucleotide provided in step (a), and the at least one polynucleotide of interest provided in step (b) are introduced in step c) into the plant cell by Agrobacterium mediated transformation. E.g., the polynucleotides are introduced simultaneously.

In an embodiment of the aforementioned methods, the polynucleotides provided in step (a), and the at least one polynucleotide of interest provided in step (b) are stably introduced in step c) into the plant cell by Agrobacterium mediated transformation.

In an embodiment of the aforementioned methods, the transgenic plant regenerated in step (d) further comprises the polynucleotide encoding the truncated transcription activator-like effector (TALE) polypeptide, or the functional variant thereof.

In an embodiment of the aforementioned methods, seeds are collected from the regenerated plants.

The present invention also contemplates a method for improving plant transformation comprising
(a) providing
  (i) a truncated transcription activator-like effector (TALE) polypeptide, or a functional variant of the truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain, and/or
  (ii) a polynucleotide encoding the truncated transcription activator-like effector (TALE) polypeptide of (i), or the functional variant thereof,
(b) providing at least one polynucleotide of interest, and
(c) introducing the polypeptide or polynucleotide provided in step (a) and the at least one polynucleotide of interest provided in step (b) into a plant, thereby improving plant transformation.

In an embodiment of the aforementioned method, the method for improving plant transformation comprises the steps of
(a) providing a polynucleotide encoding a truncated transcription activator-like effector (TALE) polypeptide, or a functional variant of the truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain,
(b) providing at least one polynucleotide of interest, and
(c) introducing polynucleotide provided in step (a) and the at least one polynucleotide of interest provided in step (b) into a plant, thereby improving plant transformation.

In an embodiment of the aforementioned methods for improving plant transformation, the transformation to be improved is Agrobacterium-mediated transformation.

In an embodiment of the aforementioned methods for improving plant transformation, the polynucleotide provided in step (a), and the at least one polynucleotide of interest provided in step (b) are introduced in step c) into the plant cell by Agrobacterium mediated transformation. E.g., the polynucleotides are introduced simultaneously.

In an embodiment of the aforementioned methods for improving plant transformation, the at least one polynucleotide of interest as provided in step b) is stably introduced into the plant by Agrobacterium-mediated transformation.

In an embodiment of the aforementioned methods for improving plant transformation, the at least one polynucleotide of interest as provided in step b) and the polynucleotide provided in step (a) (ii) are stably introduced into the plant by Agrobacterium-mediated transformation.

In an embodiment of the aforementioned methods for improving plant transformation, the truncated TALE polypeptide, or functional variant thereof, or the polynucleotide encoding said truncated polypeptide, or functional variant thereof, is transiently introduced into the plant.

In an embodiment of the aforementioned methods for improving plant transformation or for generating a plant, the polynucleotide encoding said truncated TALE polypeptide, or functional variant thereof, as provided in step (a)(ii), and the at least one polynucleotide of interest as provided in step b) are present in the same T-DNA or in different T-DNAs.

In an embodiment of the aforementioned methods for improving plant transformation, the improvement of plant transformation
  (i) enhanced transformation efficacy,
  (ii) a faster growth of transformed calli,
  (iii) a faster generation of TO plants, and/or
  (iv) an increased biomass of generated TO plants.

The present invention also relates to a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete TALE Central Repeat Region (CRR), and wherein said truncated TALE polypeptide does not comprise a transcriptional activation domain.

The present invention also relates to a polynucleotide encoding for the truncated TALE polypeptide of the present invention, or functional variant thereof.

The present invention also relates to an expression vector comprising the polynucleotide of the present invention, operably linked to a heterologous promoter.

The present invention also relates to a host cell comprising the truncated TALE polypeptide of the present invention, the polynucleotide of the present invention, or the expression vector of the present invention.

In an embodiment, the host cell is an Agrobacterium cell or a plant cell.

In an embodiment, the host cell further comprising at least one polynucleotide of interest.

The present invention also relates to a plant comprising the truncated TALE polypeptide of the present invention, the polynucleotide of the present invention, or the expression vector of the present invention.

The present invention also relates to the use of the truncated TALE polypeptide of the present invention, the polynucleotide of the present invention, or the expression vector of the present invention, for improving plant transformation.

In an embodiment of the methods, the truncated TALE polypeptide (or the functional variant thereof), the polynucleotide, the expression vector, the host cell, the plant, or the use of the present invention, the truncated TALE polypeptide does not comprise nuclear localization signals (NLSs)

In an embodiment of the methods, the truncated TALE polypeptide (or the functional variant thereof), the polynucleotide, the expression vector, the host cell, the plant, or the use of the present invention, the N-terminal region of the TALE polypeptide comprises the T3S and translocation signal and repeats −3, −2, −1 and 0 of a TALE polypeptide.

In an embodiment of the methods, the truncated TALE polypeptide (or the functional variant thereof), the polynucleotide, the expression vector, the host cell, the plant, or the use of the present invention, the N-terminal region of the truncated TALE polypeptide comprises amino acids 1 to 288 of SEQ ID NO: 10.

In an embodiment of the methods, the truncated TALE polypeptide (or the functional variant thereof), the polynucleotide, the expression vector, the host cell, the plant, or the use of the present invention, the truncated TALE polypeptide comprises an incomplete Central Repeat Region (CRR).

In an embodiment of the methods, the truncated TALE polypeptide (or the functional variant thereof), the polynucleotide, the expression vector, the host cell, the plant, or the use of the present invention, the incomplete Central Repeat Region (CRR) comprises between 0.5 and 20 repeats, such as between 0.5 and 10 repeats, between 0.5 repeats and 8 repeats, between 0.5 and 6 repeats, between 0.5 and 5 repeats, between 0.5 and 4 repeats, between 0.5 and 3 repeats, between 0.5 and 2 repeats, or between 0.5 and 1 repeats.

In an embodiment of the methods, the truncated TALE polypeptide (or the functional variant thereof), the polynucleotide, the expression vector, the host cell, the plant, or the use of the present invention, the incomplete Central Repeat Region comprises or consists of the amino acid sequence ltpeqvvaiasnsggkqal (SEQ ID NO: 23)

In an embodiment of the methods, the truncated TALE polypeptide (or the functional variant thereof), the polynucleotide, the expression vector, the host cell, the plant, or the use of the present invention, the truncated TALE polypeptide is truncated within repeats 1 to 20, repeats 1 to 15, repeats 1 to 10, repeats 1 to 8, repeats 1 to 6, repeats 1 to 5, repeats 1 to 4, repeats 1 to 3, repeats 1 to 2, or within repeat 1 of the CRR of the TALE polypeptide.

In an embodiment of the present invention (i.e. of the methods, the truncated TALE polypeptide (or the functional variant thereof), the polynucleotide, the expression vector, the host cell, the plant, or the use of the present invention), the truncated transcription activator-like effector (TALE) polypeptide is derived from a TALE polypeptide from the genus *Xanthomonas*, e.g. from *Xanthomonas oryzae*.

In an embodiment of the present invention, the truncated transcription activator-like effector (TALE) polypeptide is derived from a TALE polypeptide selected from the group consisting of AvrXa7, AvrBs3, Hax3, PthXo6, AvrXa27, AvrRxo1, PthXo1, Hax2, and Hax4.

In an embodiment of the present invention, the truncated TALE polypeptide, or functional variant thereof has an amino acid sequence comprising or consisting of
  (i) a sequence as shown in any one of SEQ ID Nos: 1, 2, 3, 7, 8, and 9,
  (ii) a sequence comprising amino acids 1 to 307 of SEQ ID NO: 10
  (iii) a sequence comprising amino acids 1 to 443 of SEQ ID NO: 10
  (iv) a sequence comprising amino acids 1 to 544 of SEQ ID NO: 10, or
  (v) a sequence which is at least 70% identical to the sequence under (i), (ii), (iii) or (iv).

In an embodiment of the present invention, the polynucleotide encoding said truncated TALE polypeptide, or functional variant thereof, comprises or consists of
  (i) a sequence as shown in any one of SEQ ID Nos: 4 to 6, or
  (ii) a sequence which is at least 70% identical to the sequence under i).

In an embodiment of the present invention, the functional variant of the truncated TALE polypeptide is capable of accelerating meristematic plant growth, when introduced into a plant.

In an embodiment of the present invention, the polynucleotide encoding the truncated TALE polynucleotide, or variant thereof, and the at least one polynucleotide of interest provided in step (b) are operably linked to a promoter.

In an embodiment of the present invention, the plant is a monocotyledonous plant.

In an embodiment of the present invention, the plant is a dicotyledonous plant.

In an embodiment of the present invention, the plant is not a tobacco plant.

In an embodiment of the present invention, the at least one polynucleotide of interest encodes a gene-editing polypeptide.

In an embodiment of the present invention, at least two polynucleotides of interest are provided in step b) and introduced into the plant cell in step b) of the methods of the present invention.

DETAILED DESCRIPTION OF THE PRESENT INVENTION—DEFINITIONS

The present invention relates to a method for generating a transgenic plant comprising at least one polynucleotide of interest, the method comprising
(a) providing
  (i) a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain, and/or
  (ii) a polynucleotide encoding the truncated transcription activator-like effector (TALE) polypeptide of (i), or the functional variant thereof,
(b) providing at least one polynucleotide of interest,
(c) introducing the polypeptide or polynucleotide provided in step (a), and the at least one polynucleotide of interest provided in step (b) into a plant cell, and
(d) regenerating a transgenic plant comprising the at least one polynucleotide of interest from said plant cell.

In an embodiment, steps (a) to (d) of the method for regenerating a transgenic plant are as follows:
(a) providing a polynucleotide encoding a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain,
(b) providing at least one polynucleotide of interest,
(c) introducing polynucleotide provided in step (a), and the at least one polynucleotide of interest provided in step (b) into a plant cell, and
(d) regenerating a transgenic plant comprising the at least one polynucleotide of interest from said plant cell.

As set forth above, the present invention further relates to a method for improving plant transformation, the method comprising steps a) and b) of the method for generating a transgenic plant and step c) introducing the polypeptide or polynucleotide provided in step (a), and the at least one polynucleotide of interest provided in step (b) into a plant cell, thereby improving plant transformation. The definitions made in connection with the method of generating a transgenic plant apply mutatis mutandis to the method for improving plant transformation.

In step (a) of the methods of the present invention, i) a truncated transcription activator-like effector (abbreviated "TALE") polypeptide, or a functional variant of said truncated TALE polypeptide, and/or ii) a polynucleotide encoding said truncated polypeptide, or the functional variant thereof, shall be provided. Said truncated TALE polypeptide shall comprise the N-terminal region of a TALE polypeptide, and optionally a complete or incomplete Central Repeat Region (CRR). However, said truncated TALE polypeptide shall not comprise, i.e. lack, a transcriptional activation domain.

As described herein below in detail, the polypeptide provided in step (a) shall be a truncated form of a TALE polypeptide, i.e. a fragment of a full-length TALE polypeptide. Full length TALE polypeptides are well known in the art and belong to the transcription activator-like (TAL) family of polypeptides (see e.g. Moore et al., 2014, and Scott et al., 2014 both of which are herewith incorporated by reference with respect to their entire disclosure content). Full-length TALE polypeptides are characterized by three conserved regions (see Cuculis et al., 2015):

- an N-terminal region (NTR) which comprises the type III translocation system required for secretion and four cryptic repeats (repeat −3, repeat −2, repeat −1 and repeat 0),
- a central repeat region (CRR, frequently also referred to as central repeat domain (CRD)) that forms specific DNA contacts, and
- a C-terminal region (CTR) comprising one or more nuclear localization signals and an acidic activation domain.

Accordingly, a full-length TALE polypeptide comprises (from N-terminus to C-terminus) a N-terminal region (NTR), a central repeat region (CRR), and a C-terminal region (CTR).

Full length TALE polypeptides, but also some truncated TALE polypeptides, are expressed by bacterial plant pathogens, in particular of the genus *Xanthomonas*. Full length TALE polypeptides of the large TAL effector family are key virulence factors of Xanthomonas and reprogram host cells by mimicking eukaryotic transcription factors. TALE polypeptides are secreted by Xanthomonas bacteria via their type III secretion system when they infect various plant species. A functional TALE polypeptide can bind promoter sequences in the host plant and activate the expression of plant genes that aid bacterial infection. It recognizes plant DNA sequences through a central repeat domain consisting of a variable number of typically 34 amino acid tandem repeats. The tandem repeats of the CRR are herein also referred to as "repeats". The amino acid sequences of the repeats are conserved, except for two adjacent highly variable residues (at positions 12 and 13) that determine specificity towards the DNA base A, G, C or T. The AAs in positions 12 and 13 are called repeat variable di-residue (RVD). Several TALEs of different strains are identical on the level of RVD sequences and are, hence, assumed to target the same plant genes, whereas other TALEs show variation in individual RVDs or even in longer, contiguous stretches of their RVD sequence. For example, a tandem repeat as set forth herein may have the following sequence: ltpdqvvaiasxxggkqaletvqrlIpvIcqdhg (SEQ ID NO: 22), wherein x can be any amino acid.

In an embodiment, the truncated TALE polypeptide as referred to herein is derived from a TALE polypeptide from the genus *Xanthomonas*, i.e. is a TALE polypeptide from the genus *Xanthomonas*. More preferably, the truncated TALE polypeptide is derived from a TALE polypeptide from a *Xanthomonas* species selected from the group of *Xanthomonas* species consisting of *X. albilineans, X. alfalfae, X. ampelina, X. arboricola, X. axonopodis, X. boreopolis, X. badrii, X. bromi, X. campestris. X. cassavae, X. citri, X. codiaei, X. cucurbitae, X. cyanopsidis, X. cynarae, X. euvesicatoria, X. frageriae, X. gardneri, X. holcicola, X. hortorum, X. hyacinthi, X. malvacerum, X. maltophila, X. manihotis, X. melonis, X. oryzae, X. papavericola, X. perforans, X. phaseoli, X. pisi, X. populi, X. sacchari, X. theicola. X. translucens, X. vasicola*, and *X. vesicatoria*. More preferably, the truncated TALE polypeptide is derived from a TALE polypeptide from *Xanthomonas oryzae*, in particular *Xanthomonas oryzae* pv. *oryzae*. *Xanthomonas oryzae* causes a serious blight of rice, other grasses and sedges.

The TALE polypeptide to be truncated as referred to in accordance with the present invention can be any TALE polypeptide. In an embodiment, the TALE polypeptide is selected from the group consisting of AvrXa7, AvrBs3, Hax3, PthXo6, AvrXa27, AvrRxo1, PthXo1, Hax2, and Hax4. In a more preferred embodiment, the truncated TALE polypeptide is a truncated AvrXa7 polypeptide. AvrXa7 is a TALE polypeptide from *Xanthomonas oryzae* pv. *oryzae*. Preferably, said AvrXa7 polypeptide has sequence as shown in SEQ ID NO: 10. The N-terminal region (NTR), the central repeat region (CRR), and the C-terminal region (CTR) of this polypeptide are as follows:

NTR: amino acids 1 to 288 of SEQ ID NO: 10
CRR: amino acids 289 to 1155 of SEQ ID NO: 10
CTR: amino acids 1156 to 1446 of SEQ ID NO: 10

The TALE polypeptide to be truncated can be a naturally occurring TALE polypeptide, as well as a non-naturally occurring TALE polypeptide. In an embodiment, the term "non-naturally occurring TALE polypeptide" refers to a naturally occurring TALE polypeptide which has been mutated. For example, mutations could be made within the DNA-binding domain. For example, the amino acids at positions 12 and/or 13 of the tandem repeats could be mutated (as compared to the naturally occurring amino acids at these positions).

As set forth above, the polypeptide provided in step a) shall be a truncated TALE polypeptide. Accordingly, the truncated TALE polypeptide is not a full-length TALE polypeptide. It comprises parts of a full-length TALE polypeptide, but lacks other parts of said TALE polypeptide. In particular, the term "truncated" refers to a truncated TALE polypeptide that lacks amino acids of at least the C-terminal region of a full-length TALE polypeptide, and thus to a TALE polypeptide having C terminal amino acids removed.

How to obtain a truncated polypeptide is well known in the art. For example, the nucleic acid sequence which encodes for the truncated polypeptide could be amplified by PCR (and cloned into a suitable vector). Also, said sequence could be produced by gene synthesis. Also, the nucleic acid sequence which encodes for parts of the TALE polypeptide which should not be present in the truncated TALE polypeptide can be removed from the polynucleotide which encodes for the full-length polynucleotide. Alternatively, artificial stop codons could be introduced at the position at which the polypeptide should be truncated.

In an embodiment, a TALE polypeptide, i.e. a full-length, TALE polypeptide, can be truncated in any region which results in a truncated polypeptide which comprises the N-terminal region as defined herein, but is devoid of the nuclear nucleation signal(s) and/or the transcriptional activation domain, yet retaining its plant transformation improving properties. In another embodiment, a TALE polypeptide, i.e. a full-length, TALE polypeptide, can be truncated in any region which results in a truncated polypeptide which comprises the N-terminal region as defined herein, but is devoid of the entire C-terminal region of the TALE polypeptide. In another embodiment, a TALE polypeptide, i.e. a full-length, TALE polypeptide, can be truncated in any region which results in a truncated polypeptide which comprises the N-terminal region as defined herein, but is devoid at least a portion of the CRR and of the entire C-terminal region of the TALE polypeptide.

In an embodiment, the truncated transcription activator-like effector (TALE) polypeptide comprises the N-terminal region (NTR) of a TALE polypeptide. Preferably, the N-terminal region of a TALE polypeptide comprises the T3S (type III S) and translocation signal and repeats −3, −2, −1 and 0 of a TALE polypeptide. The T3S (type III S) and translocation signal is herein also referred to as T3S region (see Cuculis et al., 2015). The repeat 0 is also known as T0 repeat. Repeats −3, −2, −1 and 0 are so called cryptic repeats. Thus, the N-terminal region of a TALE polypeptide comprises the T3S (type III S) and translocation signal and four cryptic repeats of a TALE polypeptide The NTRs of TALE polypeptides are known to be highly conserved. FIG. 8 shows an alignment of the NTRs of four different TALE polypeptides: AvrXa10 (SEQ ID NO: 18), AvrXa7 (SEQ ID NO: 19), AvrBS3 (SEQ ID NO: 20), and Hax3 (SEQ ID NO: 21). The N-terminal region of AvrXa7 is also shown in FIG. 9 (amino acids 1 to 288 of the sequence shown in FIG. 9). In an embodiment, the truncated TALE polypeptide comprises the NTR of AvrXa10 (or a variant thereof). In another embodiment, the truncated TALE polypeptide comprises the NTR of AvrBS3 (or a variant thereof). In another embodiment, the truncated TALE polypeptide comprises the NTR of AvrXa7 (or a variant thereof). In another embodiment, the truncated TALE polypeptide comprises the NTR of Hax3 (or a variant thereof). In an embodiment, the NTR of a TALE polypeptide comprises a sequence as shown FIG. 8, in particular a sequence shown in SEQ ID NO: 18, 19, 20 or 21, or is a variant thereof, wherein the amino acid sequence of the variant is, preferably, at least 50%, 60%, 70%, 80%, 85%, 90%, 92%, 95%, 97%, 98%, or 99% identical to the amino sequence shown in FIG. 8, in particular a sequence shown in SEQ ID NO: 18, 19, 20 or 21 (preferably, over the entire length of the aligned sequences).

In an embodiment, the NTR of a TALE polypeptide comprises amino acids 1 to 288 of SEQ ID NO: 10, or comprises an amino acid sequence which is at least 50%, 60%, 70%, 80%, 85%, 90%, 92%, 95%, 97%, 98%, or 99% identical to amino acids 1 to 288 of SEQ ID NO: 10.

In an embodiment, the truncated TALE polypeptide according to the present invention may further complete or incomplete Central Repeat Region (CRR) of a TALE polypeptide. Thus, the truncated TALE polypeptide may comprise the NTR and a complete CRR of a TALE polypeptide (preferably from N- to C-terminus). Alternatively, the truncated TALE polypeptide may comprise and an incomplete CRR of a TALE polypeptide (preferably from N- to C-terminus).

Preferably, a complete CRR comprises all amino acid tandem repeats of a full-length TALE polypeptide, whereas an incomplete CRR comprises not all amino acid tandem repeats of a full-length TALE polypeptide.

For example, an incomplete Central Repeat Region (CRR) comprises between 0.5 and 20 repeats (i.e. tandem repeats), such as between 0.5 and 10 repeats, between 0.5 repeats and 8 repeats, between 0.5 and 6 repeats, between 0.5 and 5 repeats, between 0.5 and 4 repeats, between 0.5 and 3 repeats, between 0.5 and 2 repeats, or between 0.5 and 1 repeats.

Also, it is envisaged that an incomplete CRR comprises less than 20 repeats or less than 10 repeats. In an embodiment, an incomplete CRR comprises less than 8 repeats. In another embodiment, an incomplete CRR comprises less than 5 repeats. In another embodiment, an incomplete CRR comprises less than 4 repeats. In another embodiment, an incomplete CRR comprises less than 3 repeats. In another embodiment, an incomplete CRR comprises less than 2 repeats. In another embodiment, an incomplete CRR comprises less than 1 repeat. Thus, an incomplete CRR may comprise only a incomplete repeat. For example, the incomplete Central Repeat Region comprises or consists of the amino acid sequence ltpeqvvaiasnsggkqal (SEQ ID NO:23).

A truncated TALE polypeptide comprising a complete DNA-binding domain is preferably obtained or obtainable by truncating a TALE polypeptide at the end of the DNA-binding domain of the TALE polypeptide. A truncated TALE polypeptide comprising an incomplete DNA-binding domain is preferably obtained or obtainable by truncating a TALE polypeptide within the DNA-binding domain of the TALE polypeptide. In other words, the truncated TALE polypeptide is the N-terminal portion of a TALE polypeptide which truncated within the DNA-binding domain of the TALE polypeptide (e.g. at positions described in the next paragraph).

In an embodiment, the TALE polypeptide is truncated within repeats the first twenty repeats, i.e. within any one of repeats 1 to 20, of the CRR of the TALE polypeptide. In a embodiment, the TALE polypeptide is truncated within repeats the first eight repeats, i.e. within any one of repeats 1 to 8, of the CRR of the TALE polypeptide. The repeat following the TO repeat is the first repeat. For example, the TALE peptide may be truncated within the first repeat of the DNA-binding domain, i.e. the CRR. Thus, the truncated TALE polypeptide comprises the NTR and a portion of the first repeat of the CRR of a TALE polypeptide. Further, the TALE peptide may be truncated within the second repeat of the DNA-binding domain (i.e. the repeat which follows the first repeat). Thus, the N-terminal portion comprises the NTR, the first repeat and a portion of the second repeat of a TALE polypeptide. Alternatively, the TALE polypeptide may be truncated between the second and third repeat of the DNA-binding domain. Thus, the N-terminal portion comprises the NTR, and the first and second repeat of a TALE polypeptide. Further, it is envisaged that the TALE polypeptide is truncated within the third repeat, between the third and fourth repeat, within the fourth repeat, between the fourth and fifth repeats, within the fifth repeat, between the fifth and sixth repeat, within the sixth repeat, between the sixth and seventh repeat, within the seventh repeat, between the seventh and eighth repeat, within the eighth repeat, between the eigth and ninth repeat, or within the ninth repeat of the DNA-binding domain of the TALE polypeptide. Further repeats may be present such as the $10^{th}$ repeat, $11^{th}$ repeat, the $12^{th}$ repeat etc. up to all repeats of the DNA-binding domain of the TALE polypeptide.

Thus, the TALE polypeptide can be truncated within repeats 1 to 20, repeats 1 to 15, repeats 1 to 10, repeats 1 to 8, repeats 1 to 6, repeats 1 to 5, repeats 1 to 4, repeats 1 to 3, repeats 1 to 2, or within repeat 1 of the CRR of the TALE polypeptide. Accordingly, the truncated TALE polypeptide can be obtained by is obtainable by truncating a TALE polypeptide at these positions.

The studies underlying the present invention suggest that the plant transformation could be improved even if the truncated TALE polypeptide does not have DNA-binding activity. In an embodiment of the present invention the truncated TALE polypeptide does not have DNA-binding activity. Nevertheless, it is also envisaged that the truncated TALE polypeptide has DNA-binding activity (e.g. if comprises a completed DNA-binding domain). Whether the truncated TALE polypeptide has DNA-binding activity or not can be assessed by the skilled person without further ado. Preferred assays for assessing whether a polypeptide has DNA-binding activity are e.g. disclosed in Zhang et. (2011) and Wan et al. (2016) which are both incorporated by reference.

In accordance with the present invention, the truncated TALE polypeptide shall comprise the N-terminal region of a TALE polypeptide, but shall lack certain parts of the TALE polypeptide (a i.e. a full length TALE polypeptide). Preferably, the truncated TALE polypeptide shall lack a transcriptional activation domain, in particular a TALE transcriptional activation domain. Accordingly, it shall not comprise a transcriptional activation domain, in particular a transcriptional activation domain of a TALE polypeptide. The term "transcriptional activation domain" (abbreviated "AD domain") is well known in the art. For example, the AD domain of AvrXa7 spans amino acids 1421-1446 of SEQ ID NO: 10 (see FIG. 9).

In addition to the AD domain, the truncated TALE polypeptide may lack nuclear localization signals (NLSs). Accordingly, the truncated TALE polypeptide does not comprise nuclear localization signals (and an AD domain). AvrXa7 comprises NLS at positions 1340-1345 and 1376-1380 (see also FIG. 9).

In a preferred embodiment, the truncated TALE polypeptide lacks the entire CTR (C-terminal region). Preferably, the CTR is the region after the (downstream from) half repeat of the CRR. In a preferred embodiment, the truncated TALE polypeptide lacks the half repeat and the entire CTR (C-terminal region) of a full length polypeptide. Thus, the truncated TALE polypeptide may lack portions of the CRR (or even the complete CRR), and the entire CTR.

The truncated TALE polypeptide may comprise additional elements. In an embodiment, the truncated TALE polypeptide comprises a HA (human influenza hemagglutinin) tag at its N-Terminus, in particular a 3×HA tag, i.e. a triple HA tag. The HA tag is a fragment of the human influenza hemagglutinin polypeptide. Typically, a HA tag consists of the fragment corresponding to amino acids 98-106 of said polypeptide (YPYDVPDYA, SEQ ID NO: 11). A triple HA tag has preferably the sequence as shown in SEQ ID NO: 12 (YPYDVPDYAYPYDVPDYAYPYDVPDYA). In an embodiment, said triple HA tag is encoded by a polynucleotide having a sequence as shown in SEQ ID NO: 13.

Although the truncated TALE polypeptide may comprise additional elements, it is envisaged that certain elements are not present. For example, the truncated TALE polypeptide preferably does not comprise a domain having nuclease activity (such as endonuclease activity). Accordingly, it is envisaged that the truncated TALE polypeptide as referred to herein does not have nuclease activity. Further, it is envisaged that the truncated TALE polypeptide does not have dioxygenase activity, methyltransferase activity, demethylase activity, transposase activity, and/or recombinase activity. Also, it is envisaged that the truncated TALE polypeptide is not fused to a fluorescent protein.

Preferred truncated TALE polypeptides comprise or consist of a sequence as shown in any one of SEQ ID NO: 1 to 3, or 7 to 9 (or are functional fragment thereof). The truncated TALE polypeptides having a sequence as shown in SEQ ID NO: 1, 2 and 3 were identified in the Examples underlying the present application. The truncated TALE polypeptides having a sequence as shown in SEQ ID NO: 7, 8 are 9 correspond to SEQ ID NO: 1, 2, and 3, but lack the 3×HA tag and the unnatural amino acids which result from a frameshift. The sequences are also shown in FIGS. 10 to 12.

The expression "truncated TALE polypeptide" as used herein encompasses also variants of the specific truncated TALE polypeptides as referred to herein (in particular, of truncated TALE polypeptides comprise or consist of a sequence as shown in any one of SEQ ID NO: 1, 2, 3, 7, 8, and 9). Such variants have at least the same or essentially the same biological activity as the specific truncated TALE polypeptides. In particular, a variant shall be capable of improving plant transformation as referred to herein. Also, a variant shall be capable of accelerating meristematic growth, when introduced into a plant (e.g. after introduction by Agrobacterium mediated transformation). Moreover, it is to be understood that a variant as referred to in accordance with the present invention shall have an amino acid sequence which differs from the specific polypeptides due to at least one amino acid substitution, deletion and/or addition wherein the amino acid sequence of the variant is still, preferably, at least 50%, 60%, 70%, 80%, 85%, 90%, 92%, 95%, 97%, 98%, or 99% identical with the amino sequence of the specific truncated TALE polypeptides (preferably, over the entire length of said polypeptide).

In an embodiment of the present invention, the truncated TALE polypeptide, or functional variant thereof comprises or consists of:
  (i) a sequence as shown in any one of SEQ ID Nos: 1, 2, 3, 7, 8, and 9, or a functional fragment thereof,
  (ii) a sequence comprising amino acids 1 to 307 of SEQ ID NO: 10
  (iii) a sequence comprising amino acids 1 to 443 of SEQ ID NO: 10
  (iv) a sequence comprising amino acids 1 to 544 of SEQ ID NO: 10, or
  (v) a sequence which is, in increasing order of preference, at least 50%, 60%, 70%, 80%, 85%, 90%, 95%, 98%, 99% or 100% identical to the sequence under (i), (ii), (iii) or (iv).

In an embodiment, the polynucleotide encoding said truncated TALE polypeptide, or variant thereof comprises or consists of
  (i) a sequence as shown in any one of SEQ ID Nos: 4 to 6, or
  (ii) a sequence which is, in increasing order of preference, at least 50%, 60%, 70%, 80%, 85%, 90%, 95%, 98%, 99% or 100% identical to the sequence under i).

Methods for the alignment of sequences for comparison are well known in the art, such methods include GAP, BESTFIT, BLAST, FASTA and TFASTA. GAP uses the algorithm of Needleman and Wunsch ((1970) J Mol Biol 48: 443-453) to find the global (i.e. spanning the complete sequences) alignment of two sequences that maximizes the number of matches and minimizes the number of gaps. The BLAST algorithm (Altschul et al. (1990) J Mol Biol 215: 403-10) calculates percent sequence identity and performs a statistical analysis of the similarity between the two sequences. The software for performing BLAST analysis is publicly available through the National Centre for Biotechnology Information (NCBI). Homologues may readily be identified using, for example, the ClustalW multiple sequence alignment algorithm (version 1.83), with the default pairwise alignment parameters, and a scoring method in percentage. Global percentages of similarity and identity may also be determined using one of the methods available in the MatGAT software package (Campanella et al., BMC Bioinformatics. 2003 Jul. 10; 4:29. MatGAT: an application that generates similarity/identity matrices using protein or DNA sequences). Minor manual editing may be performed to optimize alignment between conserved motifs, as would be apparent to a person skilled in the art. The sequence identity values may be determined over the entire nucleic acid or amino acid sequence or over selected domains or conserved motif(s), using the programs mentioned above using the default parameters. For local alignments, the Smith-Waterman algorithm is particularly useful (Smith T F, Waterman M S (1981) J. Mol. Biol 147(1); 195-7).

In an embodiment, the algorithm of Needleman and Wunsch (see above) is used for the comparison of sequences. The algorithm is incorporated in the sequence alignment software packages GAP Version 10 and wNEEDLE. E.g., wNEEDLE reads two sequences to be aligned, and finds the optimum alignment along their entire length. When amino acid sequences are compared, a default Gap open penalty of 10, a Gap extend penalty of 0.5, and the EBLOSUM62 comparison matrix are used. When DNA sequences are compared using wNEEDLE, a Gap open penalty of 10, a Gap extend penalty of 0.5, and the EDNAFULL comparison matrix are used.

The expression "truncated TALE polypeptide" as used herein encompasses also functional fragments of the specific truncated TALE polypeptides, in particular, of truncated TALE polypeptides comprising or consist of a sequence as shown in any one of SEQ ID NO: 1, 2, 3, 7, 8, and 9.

In step b) of the method of the present invention at least one polynucleotide of interest is provided. The term "at least one" means one or more than one. Thus, it is envisaged to provide one, two, three, four, five or more polynucleotides of interest. Preferably, said polynucleotide(s) shall be stably introduced into the plant, i.e. it/they shall be introduced into the plant's genome. The expression "polynucleotide of interest" as used herein, preferably, refers to any polynucleotide that should be expressed the plant to be transformed, as described herein. In an embodiment, the polynucleotide of interest is a polynucleotide which encodes for a polypeptide (such as enzyme, a structural protein, or transcription factor). Further, the polynucleotide of interest may also encode for structural RNA or an active RNA such as an antisense RNA, an interfering RNA (such as a miRNA) or a ribozyme. Also, the at polynucleotide of interest may encode for a single-guide RNA (sgRNA).

In an embodiment of the methods of the present invention, at least two polynucleotides of interest are provided in step b) of the methods of the present invention (and are introduced into the plant cell in step c)). Preferably, the at least two polynucleotides of interest are different polynucleotides. One of the at least two polynucleotide of interest may be e.g. a marker gene which allows for the selection of plants which comprise said marker gene.

In an embodiment, said polynucleotide of interest is heterologous with respect to the plant. In another embodiment, said polynucleotide of interest is homologous with respect to the plant.

In a preferred embodiment of the method of the present invention, the polynucleotide of interest encodes for a gene-editing polypeptide. As used herein, the term "gene-editing polypeptide" refer to a polypeptide which is capable (either alone or in combination with other polypeptide) to edit the genome of the plant (to be transformed). Such gene-editing polypeptides are well known in the art and e.g. reviewed in (see Mohanta et al., 2017). In a preferred embodiment, the gene-editing polypeptide is a RNA-guided DNA endonuclease, in particular Cas9 (CRISPR associated protein 9). Also it is envisaged that said the gene-editing polypeptide is dCas9 (dead Cas9) which is a mutant form of Cas9 whose endonuclease activity is removed.

In a particularly preferred embodiment of the present invention, the polynucleotide of interest encodes a polypeptide selected from the group of polypeptides comprising Polydactyl zinc finger-FokI, Polydactyl zinc finger-cytidine deaminase, Polydactyl zinc finger-TevI, Polydactyl zinc finger-adenine deaminase, TALE-FokI, TALE-cytidine deaminase, TALE-TevI, TALE-adenine deaminase, CRISPR-Cas9, CRISPR-dCas9-FokI, CRISPR-dCas9-cytidine deaminase, CRISPR-dCas9-TevI, CRISPR-dCas9-adenine deaminase, CRISPR-Cpf1, CRISPR-dCpf1-FokI, CRISPR-dCpf1-cytidine deaminase, CRISPR-dCpf1-TevI, CRISPR-dCpf1-adenine deaminase, a homing endonucleases (such as I-SceI, I-CreI, I-CeuI), a CRE recombinase, and a fusion polypeptide of DNA binding domains to integrases and recombinases. Preferred polypeptides are CRISPR-Cas9 and TALE-FokI.

The polynucleotides provided in accordance with the method of the present invention, in particular the polynucleotide as referred to in step (a), item (ii) and/or the polynucleotide as referred to in step (b) of the above method, typically, are operably linked to a promoter. In particular, both the polynucleotide provided in step (a)(ii) and the polynucleotide provided in step (b) are operably linked to a promoter. Preferably, they are linked to different promoters.

Preferably, the promoter is heterologous with respect to the polynucleotide provided in step (a)(ii) and the polynucleotide provided in step (b), i.e. it is not the promoter which is naturally linked to said polynucleotides.

The term "operably linked" as used herein refers to a functional linkage between the promoter sequence and the polynucleotide encoding the truncated TALE polypeptide (or functional variant thereof) or the at least one at least one polynucleotide of interest. The term is to be understood as meaning, for example, the sequential arrangement of a regulatory element (e.g. a promoter) with a nucleic acid sequence to be expressed and, if appropriate, further regulatory elements (such as a terminator) in such a way that each of the regulatory elements can fulfil its intended function to allow, modify, facilitate or otherwise influence expression of said nucleic acid sequence. As a synonym the wording "operable linkage" or "operably linked" may be used. The expression may result, depending on the arrangement of the nucleic acid sequences, in sense or antisense RNA. Preferred arrangements are those in which the nucleic acid sequence to be expressed is recombinantly positioned behind the sequence acting as promoter, so that the two sequences are linked covalently to each other. The distance between the promoter sequence and the polynucleotide to be expressed is preferably less than 200 base pairs, especially preferably less than 100 base pairs, very especially preferably less than 50 base pairs.

The term "promoter" is well known in the art. The term "promoter" typically refers to a nucleic acid control sequence located upstream from the transcriptional start of a gene and which is involved in recognising and binding of RNA polymerase and other proteins, thereby directing transcription of an operably linked nucleic acid. Encompassed by the aforementioned terms are transcriptional regulatory sequences derived from a classical eukaryotic genomic gene (including the TATA box which is required for accurate transcription initiation, with or without a CCAAT box sequence) and additional regulatory elements (i.e. upstream activating sequences, enhancers and silencers) which alter gene expression in response to developmental and/or external stimuli, or in a tissue-specific manner. Also included within the term is a transcriptional regulatory sequence of a classical prokaryotic gene, in which case it may include a −35 box sequence and/or −10 box transcriptional regulatory sequences. The term "regulatory element" also encompasses a synthetic fusion molecule or derivative that confers, activates or enhances expression of a nucleic acid molecule in a cell, tissue or organ. It is to be understood that the promoter shall be active in the plant. Preferably, the promoter which is operably linked to the polynucleotide encoding the truncated TALE polypeptide (or variant thereof) is active in the transformed plant cells. Accordingly, it is envisaged that the truncated TALE polypeptide (or variant thereof) is expressed in the cells in which the polynucleotide has been introduced (in particular, in step c) of the methods of the present invention).

A "plant promoter" comprises regulatory elements, which mediate the expression of a coding sequence segment in plant cells. Accordingly, a plant promoter need not be of plant origin, but may originate from viruses or microorganisms, for example from viruses which attack plant cells. The "plant promoter" can also originate from a plant cell, e.g. from the plant which is transformed with the nucleic acid sequence to be expressed in the inventive process and described herein. This also applies to other "plant" regulatory signals, such as "plant" terminators. The promoters upstream of the nucleotide sequences useful in the methods of the present invention can be modified by one or more nucleotide substitution(s), insertion(s) and/or deletion(s) without interfering with the functionality or activity of either the promoters, the open reading frame (ORF) or the 3'-regulatory region such as terminators or other 3' regulatory regions which are located away from the ORF. It is furthermore possible that the activity of the promoters is increased by modification of their sequence, or that they are replaced completely by more active promoters, even promoters from heterologous organisms. For expression in plants, the nucleic acid molecule must, as described above, be linked operably to or comprise a suitable promoter which expresses the gene at the right point in time and with the required spatial expression pattern.

In an embodiment of the present invention, the promoter is a constitutive promoter. A "constitutive promoter" refers to a promoter that is transcriptionally active during most, but not necessarily all, phases of growth and development and under most environmental conditions, in at least one cell, tissue or organ. Examples for constitutive promoters are the actin promoter (McElroy et al, Plant Cell, 2: 163-171, 1990), CAMV 35S promoter (see e.g. Odell et al, Nature, 313: 810-812, 1985), the GOS2 promoter (See e.g. de Pater et al, Plant J November; 2(6):837-44, 1992, WO 2004/065596) or the ubiquitin promoter. In an embodiment, the constitutive promoter is the ubiquitin promoter, in particular the ubiquitin promoter from maize.

In an embodiment, the promoters is not the CAMV 35S promoter. E.g., the promoter is not the CAMV 35S promoter used for expressing the truncated TALE polypeptides shown in FIG. 1 of Schornack et al. (2004).

In another embodiment, the promoter is a developmentally-regulated promoter. A "develop-mentally-regulated promoter" is active during certain developmental stages or in parts of the plant that undergo developmental changes.

In another embodiment, the promoter is an inducible promoter. An "inducible promoter" has induced or increased transcription initiation in response to a chemical (for a review see Gatz 1997, Annu. Rev. Plant Physiol. Plant Mol. Biol., 48:89-108), environmental or physical stimulus, or may be "stress-inducible", i.e. activated when a plant is exposed to various stress conditions, or a "pathogen-inducible" i.e. activated when a plant is exposed to expo-sure to various pathogens.

In another embodiment, the promoter is an organ-specific or tissue-specific promoter. An "organ-specific" or "tissue-specific promoter" is one that is capable of preferentially initiating transcription in certain organs or tissues, such as the leaves, roots, seed tissue etc. For example, a "root-specific promoter" is a promoter that is transcriptionally active predominantly in plant roots, substantially to the exclusion of any other parts of a plant, whilst still allowing for any leaky expression in these other plant parts. Promoters able to initiate transcription in certain cells only are referred to herein as "cell-specific".

In an embodiment, the organ-specific or tissue-specific promoter is selected from a root-specific promoter, a seed-specific promoter, an endosperm-specific promoter, an embryo specific promoter, an aleurone-specific promoter, a leaf specific promoter, and a meristem-specific promoter.

Further, the promoter may be a callus specific promoter. For example, the callus specific promoter may be the AoPR1 promoter (as disclosed in U.S. Pat. No. 6,031,151), the 1178-21 promoter (as disclosed in WO 02/097085), the CSP-promoter (as disclosed in Wakasa et al., 2007), or the MsPRP2 promoter (as disclosed in Winicov et al., 2004).

Typically, the polynucleotide provided in step (a)(ii) and the polynucleotide provided in step (b) are also operably linked to a terminator. The term "terminator" encompasses a control sequence which is a DNA sequence at the end of a transcriptional unit which signals 3' processing and polyadenylation of a primary transcript and termination of transcription. The terminator can be derived from the natural gene, from a variety of other plant genes, or from T-DNA. The terminator to be added may be derived from, for example, the nopaline synthase or octopine synthase genes, or alternatively from another plant gene, or less preferably from any other eukaryotic gene.

In step (c) of the aforementioned method, the polypeptide or variant thereof provided in step (a), item (i), or the polynucleotide, or variant thereof, provided in step (a), item (ii), and the at least one polynucleotide of interest provided in step (b) are introduced into the plant, i.e. a plant cell. Preferably, the polynucleotide, or variant thereof, provided in step (a), item (ii), and the at least one polynucleotide of interest provided in step (b) are introduced into the plant, e.g. by Agrobacterium mediated plant transformation. Typically, the polynucleotides are introduced simultaneously in the plant.

The combined introduction of the polypeptide or variant thereof provided in step (a), item (i) and the at least one polynucleotide of interest provided in step (b), or the combined introduction of the polynucleotide or variant thereof provided in step (a), item (ii) and the at least one polynucleotide of interest provided in step (b) allows for improving plant transformation.

Plants that are particularly useful accordance with the present invention (and thus plants that are be transformed) include all plants which belong to the superfamily Viridiplantae, in particular plants selected from the list comprising *Acer* spp., *Actinidia* spp., *Abelmoschus* spp., *Agave sisalana*, *Agropyron* spp., *Agrostis stolonifera*, *Allium* spp., *Amaranthus* spp., *Ammophila arenarla*, *Ananas comosus*, *Annona* spp., *Aplum graveolens*, *Arachls* spp, *Artocarpus* spp., *Asparagus officinaliS*, *Avena* spp. (e.g. *Avena satlva*, *Avena fatua*, *Avena byzantine*, *Avena fatua* var. *sativa*, *Avena hybrida*), *Averrhoa carambola*, *Bambusa* sp., *Benincasa hispida*, *Bertholletia excelsea*, *Beta vulgaris*, *Brassica* spp. (e.g. *Brassica napus*, *Brassica rapa ssp.* [canola, oilseed rape, turnip rape]), *Cadaba farinoses*, *Camellia sinensis*, *Cannaindica*, *Cannabis sativa*, *Capsicum* spp., *Carex elate*, *Carica papaya*, *Carissa macrocarpa*, *Carya* spp., *Carthamus tinctorius*, *Castanea* spp., *Celba pentandra*, *Cichorium endivia*, *Cinnamomum* spp., *Citrullus lanatus*, *Citrus* spp., *Cocos* spp., *Coffee* spp., *Colocasia esculenta*, *Cola* spp., *Corchorus* sp., *Coriandrum sativum*, *Corylus* spp., *Crataegus* spp., *Crocus sativus*, *Cucurbita* spp., *Cucumis* spp., *Cynara* spp., *Daucus carota*, *Desmodium* spp., *Dimocarpus longan*, *Dioscorea* spp., *Diospyros* spp., *Echinochloa* spp., *Eleeis* (e.g. *Elaeis guineensis*, *Elaeid oleiferal*, *Eleusine coracana*, *Eragrostis tef*, *Erianthus* sp., *Eriobotrya japonica*, *Eucalyptus* sp., *Eugenia uniflora*, *Fagopyrum* spp., *Fagus* spp., *Festuca arundinacea*, *Ficus carica*, *Fortunella* spp., *Fragaria* spp., *Ginkgo biloba*, *Glycine* spp. (e.g. *Glycine max*, *Soja hispida* or *Soja* max), *Gossypium hirsutum*, *Helianthus* spp. (e.g. *Helianthus thus annuus*), *HemerocalliS fulva*, *Hibiscus* spp., *Hordeum* spp. (e.g. *Hordeum vulgare*), *Ipomoea batatas*, *Juglans* spp., *Lactuca sativa*, *Lathyrus* spp., *Lens culinais*, *Linum usitatissimum*, *Litchi chinensis*, *Lotus* spp., *Luffa acutangula*, *Lupinus* spp., *Luzula sylvatica*, *Lycoperiscon* spp. (e.g. *Lycopersicon esculentum*, *Lycopersicon lycopersicum*, *Lycopersicon pynforme*), *Macrotyloma* spp., *Malus* spp., *Malpighia emarginata*, *Mammea americana*, *Mangifera indica*, *Manihot* spp., *Manlikara zapota*, *Medicago sativa*, *Melllotus* spp., *Mentha* spp., *Miscanthus sinensis*, *Momordica* spp., *Morus nigra*, *Musa* spp., *Nicotiana* spp., *Olea* spp., *Opuntia* spp., *Ornithopus* spp., *Oryza* spp. (e.g. *Oryza sativa*, *Oryza latifolia*), *Panicum miliaceum*, *Panicum virgatum*, *Passiflora edulis*, *Pastinaca sativa*, *Pennisetum* sp., *Persea* spp., *Petroselinum crispum*, *Phalanis arundinacea*, *Phaseolus* spp., *Phleum pretense*, *Phoenb* (spp., *Phragmites australis*, *Physalis* spp., *Pinus* spp., *Pistacia vera*, *Pisum* spp., *Poa* spp., *Populus* spp., *Prosopis* spp., *Prunus* spp., *Psidium* spp., *Punica granatum*, *Pyrus communis*, *Quercus* spp., *Raphanus sativus*, *Rheum rhabarbarum*, *Ribes* spp., *Ricinus communis*, *Rubus* spp., *Saccharum* spp., *Salix* sp., *Sambucus* spp., *Secale cereals*, *Sesamum* spp., *Sinapis* sp., *Solanum* spp. (e.g. *Solanum tuberosum*, *Solanum integrifolium* or *Solanum lycopersicum*), *Sorghum bicolor*, *Spinacia* spp., *Syzygium* spp., *Tagetes* spp., *Tamarindus indica*, *Theobroma cacao*, *Tnfolium* spp., *Tripsacum dactyloides*, *Tnticosecale rimpaui*, *Triticum* spp. (e.g. *Triticum aestivum*, *Triticum durum*, *Triticum turgidum*, *Triticum hybernum*, *Triticum macha*, *Triticum sativum*, *Triticum monococcum* or *Triticum vulgare*), *Tropaeolum minus*, *Tropaeolum majus*, *Vaccinium* spp., *Vicia* spp., *Vigna* spp., *Viola odorata*, *Vitis* spp., *Zea mays*, *Zizania palustris*, *Ziziphus* spp., amongst others.

In an embodiment, the plant is a monocotyledonous plant (such as maize or rice which were transformed in the studies underlying the present invention, see Examples section). In another embodiment, the plant is a dicotyledonous plant (such as sunflower or *Arabidopsis thaliana*).

According to an embodiment of the present invention, the plant is a crop plant. Examples of crop plants include but are not limited to chicory, carrot, cassava, trefoil, soybean, beet, sugar beet, sunflower, canola, alfalfa, rapeseed, linseed, cotton, tomato, and potato. According to another embodiment of the present invention, the plant is a cereal. Preferred cereal include rice, maize, wheat, barley, millet, rye, triticale, sorghum, emmer, spelt, einkorn, teff, milo and oats.

In an embodiment of the present invention, the plant is not a tobacco plant. In another embodiment, the polypeptide and/or polynucleotide provided in steps a) i) and ii) are not introduced into a plant cell by leaf infiltration of tobacco leafs.

The method of the present invention shall allow for improving plant transformation, in particular transformation of the at least one polynucleotide of interest as referred to herein into a plant. The transformation of said at least one polynucleotide is interest into a plant is improved by the co-introduction of the polypeptide provided in step (a)(i) and/or the polynucleotide provided in step (a)(ii) of the method of the present invention (see step c). Preferably, plant transformation is improved as compared to plant transformation which does not comprise the introduction of the polypeptide provided in step (a)(i) and/or the polynucleotide provided in step (a)(ii).

The term "transformation" as referred to herein encompasses the transfer of a polynucleotide, herein referred to a polynucleotide of interest, into a plant host cell. Plant tissue capable of subsequent clonal propagation, whether by organogenesis or embryogenesis, may be transformed with a genetic and a whole plant regenerated there from. The particular tissue chosen will vary depending on the clonal propagation systems available for, and best suited to, the particular species being transformed. Exemplary tissue targets include leaf disks, pollen, embryos, cotyledons, hypocotyls, megagametophytes, callus tissue, existing meristematic tissue (e.g., apical meristem, axillary buds, and root meristems), and induced meristem tissue (e.g., cotyledon meristem and hypocotyl meristem). The polynucleotides as referred to herein are preferably transiently and more preferably stably introduced into a host cell. The resulting transformed plant cell may then be used to regenerate a transformed plant in a manner known to persons skilled in the art.

Transformation of plant species is now a fairly routine technique. Advantageously, any of several transformation methods may be used to introduce the gene of interest into a suitable ancestor cell. In a preferred embodiment of the method of the present invention, the term "plant transformation" refers to Agrobacterium-mediated plant transformation. Thus, the at least the at least one polynucleotide of interest as provided in step b) of the method of the present invention is introduced into the plant by Agrobacterium-mediated plant transformation. In a preferred embodiment, both the polynucleotide provided in step (a)(i) and the at least one polynucleotide provided in step (b) are introduced, in particular stably introduced, into the plant by Agrobacterium-mediated plant transformation. In order to allow for the introduction into the plant, the polynucleotide encoding said truncated TALE polypeptide, or functional variant thereof, as provided in step (a)(ii), and the at least one polynucleotide of interest as provided in step b) are present in the same T-DNA or in different T-DNAs. Accordingly, the present invention also contemplates a T-DNA comprising the polynucleotide as defined in step (a)(ii) and at least one polynucleotide of interest as defined in step b) of the method of the present invention. Further, the present invention also contemplates a set of two T-DNAs, wherein the first T-DNA comprises the polynucleotide as defined in step (a)(ii) and the second T-DNA comprises at least one polynucleotide of interest as defined in step b) of the method of the present invention.

The two polynucleotides as referred to in the previous paragraph can be introduced simultaneously into the plant in step c) of the methods of the present invention. E.g., they may be co-transformed into a plant cell by Agrobacterium mediated transformation.

Alternatively, the two polynucleotides can be introduced into the plant at different time points. For example, in a first step the polypeptide or polynucleotide provided in step (a) is introduced into the plant, followed by the introduction of the at least one polynucleotide of interest provided in step (b) in a second step. In an embodiment, the plant into which the polynucleotide of interest of step (b) is introduced may already stably comprise the polynucleotide encoding a truncated transcription activator-like effector (TALE) polypeptide. In this case, step (c) of the aforementioned method comprises the introducing the at least one polynucleotide of interest provided in step (b) into a plant which comprises (and expresses) the polynucleotide as defined in step (a)(ii).

The transformation of plants by means of *Agrobacterium tumefaciens* is described, for example, by Höfgen and Willmitzer in Nucl. Acid Res. (1988) 16, 9877 or is known inter alia from F. F. White, Vectors for Gene Transfer in Higher Plants; in Transgenic Plants, Vol. 1, Engineering and Utilization, eds. S. D. Kung and R. Wu, Academic Press, 1993, pp. 15-38. Methods for maize transformation, are e.g. described in either Ishida et al. (Nat. Biotechnol 14(6): 745-50, 1996) or Frame et al. (Plant Physiol 129(1): 13-22, 2002). Methods for *Agrobacterium*-mediated transformation of rice include well known methods for rice transformation, such as those described in any of the following: European patent application EP 1198985 A1, Aldemita and Hodges (Planta 199: 612-617, 1996); Chan et al. (Plant Mol Biol 22 (3): 491-506, 1993), Hiei et al. (Plant J 6 (2): 271-282, 1994), which disclosures are incorporated by reference herein as if fully set forth. In the case of corn transformation, the preferred method is as described in either Ishida et al. (Nat. Biotechnol 14(6): 745-50, 1996) or Frame et al. (Plant Physiol 129(1): 13-22, 2002). The nucleic acids or the construct to be expressed is preferably cloned into a vector, which is suitable for transforming *Agrobacterium tumefaciens*, for example pBin19 (Bevan et al., Nucl. Acids Res. 12 (1984) 8711). Agrobacteria transformed by such a vector can then be used in known manner for the transformation of plants, such as plants used as a model, like *Arabidopsis* (*Arabidopsis thaliana* is within the scope of the present invention not considered as a crop plant), or crop plants such as, by way of example, tobacco plants, for example by immersing bruised leaves or chopped leaves in an agrobacterial solution and then culturing them in suitable media.

The transformation method to be applied in accordance with the present invention, preferably, requires formation of a callus. In an embodiment, the transformation method is not germline line transformation (such as the Floral Dip transformation method). Further, it is envisaged that the transformed explants are not germinating seeds.

Transformation methods may also include the use of liposomes, electroporation, chemicals that increase free DNA uptake, injection of the DNA directly into the plant, particle gun bombardment, transformation using viruses or pollen and microinjection. Methods may be selected from the calcium/polyethylene glycol method for protoplasts (Krens, F. A. et al., (1982) Nature 296, 72-74; Negrutiu I et al. (1987) Plant Mol Biol 8: 363-373); electroporation of protoplasts (Shillito R. D. et al. (1985) Bio/Technol 3, 1099-1102); microinjection into plant material (Crossway A et al., (1986) Mol. Gen Genet 202: 179-185); DNA or RNA-coated particle bombardment (Klein T M et al., (1987) Nature 327: 70) infection with (non-integrative) viruses and the like.

It is to be understood that the present invention not limited to the stable introduction of the polynucleotides as referred to herein. Rather, the polypeptide and the polynucleotide(s) as referred to in step (c), in particular the truncated TALE polypeptide, or the polynucleotide encoding said truncated TALE polypeptide, can be also transiently introduced into the plant (in step (c) of the method of the present invention. E.g., transient introduction can be obtained by particle bombardment, by cell penetrating peptides, by using suitable viral vectors, or by using zwitterions, by using PEG, by using nanoparticles, by using whiskers or by using type 3 or type 4 secretion systems. transiently; either as episomal-encoded DNA (including viral vectors) or as mRNA/protein. For example, Agrobacterium may be used to transiently introduce the truncated TALE polypeptide as a fusion with the type IV secretion signal of VirF. In principle, a type III secretion system could be also used to introduce the truncated TALE polypeptide. Further, fusions of the truncated TALE polypeptide to VirD2 or VirE2 are envisaged.

The present invention also contemplates a combination of stable introduction and transient introduction. For example, it is contemplated that the at least one polynucleotide of interest as provided in step b) is stably introduced into the plant by Agrobacterium-mediated transformation, whereas the polypeptide provided in step (a)(i) or the polynucleotide provided in step (a)(ii) of the method of the present invention is transiently introduced into the plant. In this case, it is not required to remove the polynucleotide encoding for the truncated TALE polypeptide at later stages.

The plant cells transformed by the method of the present invention can be regenerated via all methods with which the skilled worker is familiar. Generally, after transformation, plant cells or cell groupings are selected for the presence of one or more markers which are encoded by plant-expressible genes co-transferred with the gene of interest, following which the transformed material is regenerated into a whole plant. To select transformed plants, the plant material obtained in the transformation is, as a rule, subjected to selective conditions so that transformed plants can be distinguished from untransformed plants. For example, the seeds obtained in the above-described manner can be planted and, after an initial growing period, subjected to a suitable selection by spraying. A further possibility consists in growing the seeds, if appropriate after sterilization, on agar plates using a suitable selection agent so that only the transformed seeds can grow into plants. Alternatively, the transformed plants are screened for the presence of a selectable marker such as the ones described above.

The generated transformed plants may be propagated by a variety of means, such as by clonal propagation or classical breeding techniques. For example, a first generation (or T1) transformed plant may be selfed and homozygous second-generation (or T2) transformants selected, and the T2 plants may then further be propagated through classical breeding techniques. Advantageously, the T1 plants generated by the method of the plants did not show the phenotype of the TO plants. This allows a better analysis of the phenotype caused by the presence of the polynucleotide of interest.

As set forth above, the introduction of the polypeptide or polynucleotide provided in step (a) of the methods of the present invention allows for an improvement of plant transformation. The expression "improvement of plant transformation" as used herein typically refers to an improved transformation of the at least one polynucleotide of interest into a plant. As set forth above, plant transformation is improved as compared to plant transformation without the introduction of the polypeptide or polynucleotide provided in step a), i.e. as compared to a method which does not comprise, i.e. lacks, the step of introducing said polynucleotide or polypeptide.

In an embodiment, the improvement of plant transformation is selected from
(i) enhanced transformation efficacy,
(ii) a faster growth of transformed calli,
(iii) a faster generation of TO plants, and
(iv) an increased biomass of generated TO plants.

The terms "increased" or "enhanced" in the context of a plant transformation are inter-changeable and shall mean in the sense of the application an increase of at least 10%, preferably at least 15% or 20%, more preferably 25%, 30%, 35% or 40%, even more preferably at least 70% or most preferably at least 100% of the transformation efficacy, the diameter of generated calli, or the biomass, in particular in comparison a control transformation which lacks the step of introducing the polynucleotide or polypeptide as defined in step a) of the method of the present invention.

A faster generation of TO plants means that the regeneration of TO requires less time when carrying out the method of the present invention in comparison a control transformation which lacks the step of introducing the polynucleotide or polypeptide as defined in step a) of the method of the present invention. Preferably, the regeneration of TO plants may require at least 10%, more preferably at least 15%, and most preferably at least 20% less time than the control. For example, it has been shown in the studies underlying the present invention that rice plants produced by the present method, regenerated 1-2 weeks earlier than control plants. Thus, the time needed for the regeneration of TO plants may be shortened by about one to two weeks by the method of the present invention.

Further, a faster growth of transformed calli was observed. The transformed calli obtained by the method of the present invention had an increased diameter as compared to calli that were obtained by a control transformation.

Step (d) of the aforementioned method for generating a transgenic plant comprises the regeneration of a transgenic plant comprising the at least one polynucleotide of interest. Thus, a whole plant is regenerated from a plant cell which comprises the at least one polynucleotide of interest. Said regenerated (whole) plant shall comprise, preferably stably comprise the at least one polynucleotide of interest. Preferably, the regenerated plant further comprises (in particular stably comprises) the polynucleotide encoding the truncated TALE polypeptide (in case the polynucleotide as forth in step (a), item (ii) has been introduced).

After introduction of the polynucleotide in step b) and optionally the polynucleotide as set forth in step a)(ii) into the plant, in particular after transformation target cells, cell division is induced by specific plant hormones in order to grow a callus from a transformed plant cell. After callus induction, the resulting callus is transferred to a medium allowing shoot induction. The callus is incubated (under in vitro conditions) on said medium until shoots are formed. After shoot formation, the shoot is transferred to a medium that allows for root formation (under in vitro conditions). After root formation, regenerated plantlets (i.e. shoots with roots) are usually transferred from in vitro conditions to ex vitro conditions, mostly to soil or hydroponic media under greenhouse conditions.

The definitions and explanations given herein above in connection with the methods of the present invention preferably apply mutatis mutandis to the following.

The present invention further concerns a truncated transcription activator-like effector (TALE) polypeptide, or a functional variant of said truncated TALE polypeptide, wherein said truncated TALE polypeptide comprises the N-terminal region of a TALE polypeptide, and optionally a complete or incomplete TALE Central Repeat Region (CRR), and wherein said truncated TALE polypeptide does not comprise a transcriptional activation domain (as defined elsewhere herein in connection with the method of the present invention).

In an embodiment of the present invention, said polypeptide consists of or comprises
  (i) a sequence as shown in any one of SEQ ID Nos: 1, 2, 3, 7, 8, and 9, or a functional fragment thereof or
  (ii) a sequence which is, in increasing order of preference, at least 50%, 60%, 70%, 80%, 85%, 90%, 95%, 98%, 99% or 100% identical to the sequence under i).

Moreover, the present invention relates to a polynucleotide encoding for the truncated TALE polypeptide of the present invention.

In an embodiment, said polynucleotide consists of or comprises
  (i) a sequence as shown in any one of SEQ ID Nos: 4 to 6, or
  (ii) a sequence which is, in increasing order of preference, at least 50%, 60%, 70%, 80%, 85%, 90%, 95%, 98%, 99% or 100% identical to the sequence under i).

Further the present invention concerns a vector comprising the polynucleotide of the present invention. Preferably, said vector is an expression vector, i.e. a vector with allows for expression of the truncated polypeptide of the present invention. Thus, it is envisaged that said polynucleotide is operably linked to a promoter. In an embodiment, said promoter is heterologous with respect the polynucleotide of the present invention.

The present invention also concerns a host cell, in particular a non-human host cell, comprising the polypeptide of the present invention, the polynucleotide of the present invention and/or the vector of the present invention.

In preferred embodiment, said host cell is a plant cell, e.g. cell from a plant as specified above. For example, the host cell may be a cell from a monocotyledonous plant (such as a maize or rice cell) or a dicotyledonous plant (such as a sunflower or soybean cell). In another preferred embodiment, the host cell is a bacterial cell. For example, the bacterial cell is an *E. coli* cell or an *Agrobacterium* cell such as an *Agrobacterium tumefaciens* cell.

The present invention also concerns a plant comprising the polypeptide of the present invention, the polynucleotide of the present invention and/or the vector of the present invention.

In a preferred embodiment of the aforementioned host cell or plant, the host cell or plant preferably further comprises at least one polynucleotide of interest. The polynucleotide of interest has been defined elsewhere herein. The definition applies accordingly.

Further, it is envisaged that the host cell or plant stably comprises the polynucleotide encoding for the truncated TALE polypeptide of the present invention.

Also the present invention contemplates the use of the truncated TALE polypeptide of the present invention, the polynucleotide of the present invention, or the vector of the present invention for improving plant transformation. Further, the present invention contemplates the use of the truncated TALE polypeptide of the present invention, the polynucleotide of the present invention, or the vector of the present invention for generating a transgenic plant comprising at least one polynucleotide of interest.

Finally, the present invention relates to a kit comprising the polypeptide of the present invention, the polynucleotide the of the present invention, or the vector (or the expression vector of the present invention). In a preferred embodiment, the kit further comprises at least one polynucleotide of interest (as defined elsewhere herein).

The Figures show:

FIG. 1: Overview of the constructs used in the studies underlying the present invention (sequences in the figures: TNACGCGGGAN is SEQ ID NO: 15, TNATCTGNA is SEQ ID NO: 16)

Figure 2:
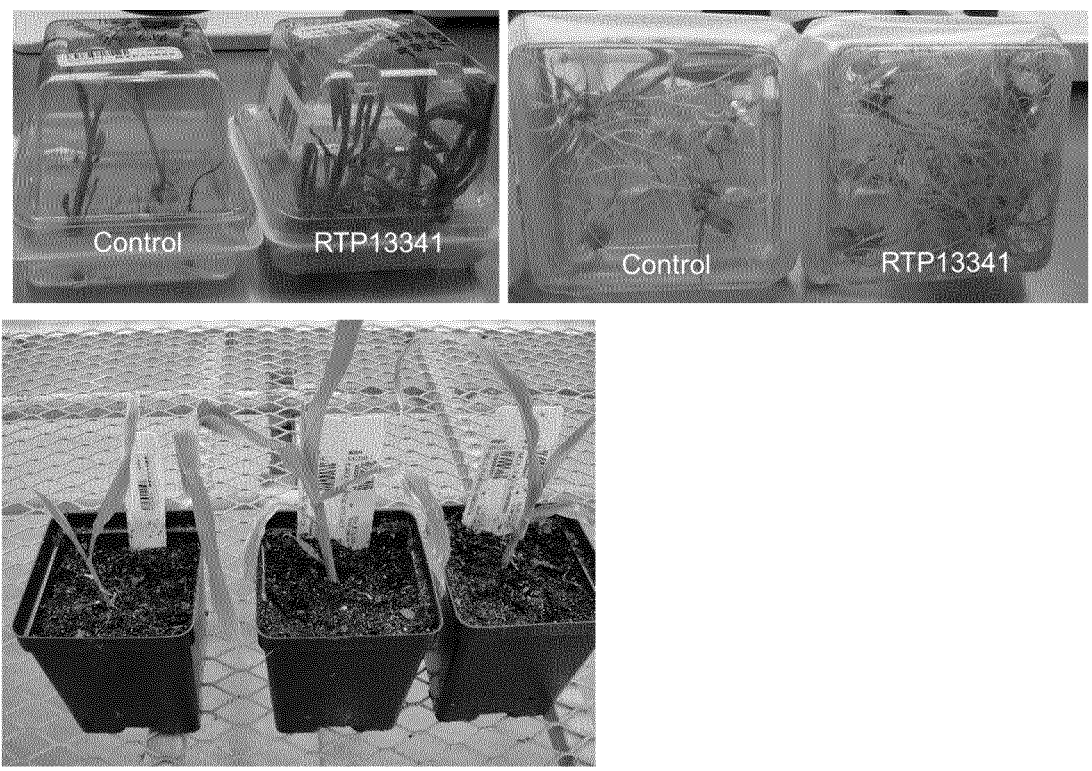

FIG. 2: RTP13341 promotes transformation efficacy, boosts regeneration and shortens time lines in the generation of TO plants. The control (RTP11885) and RTP13341 plants were derived from the same transformation date and an equal number of plants are present in the boxes.

Figure 3:
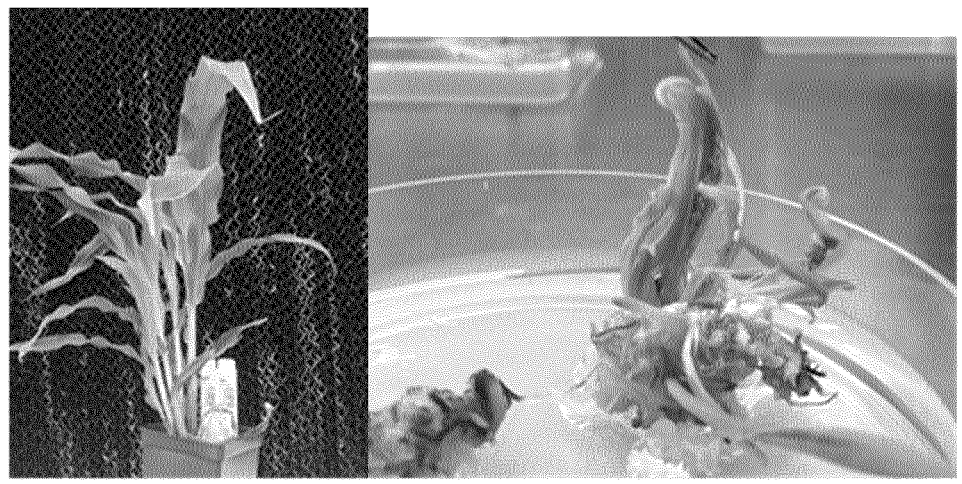

FIG. 3: Tillering (left, RTP13336) and abnormal leaf development (right, RTP13346)

Figure 4:
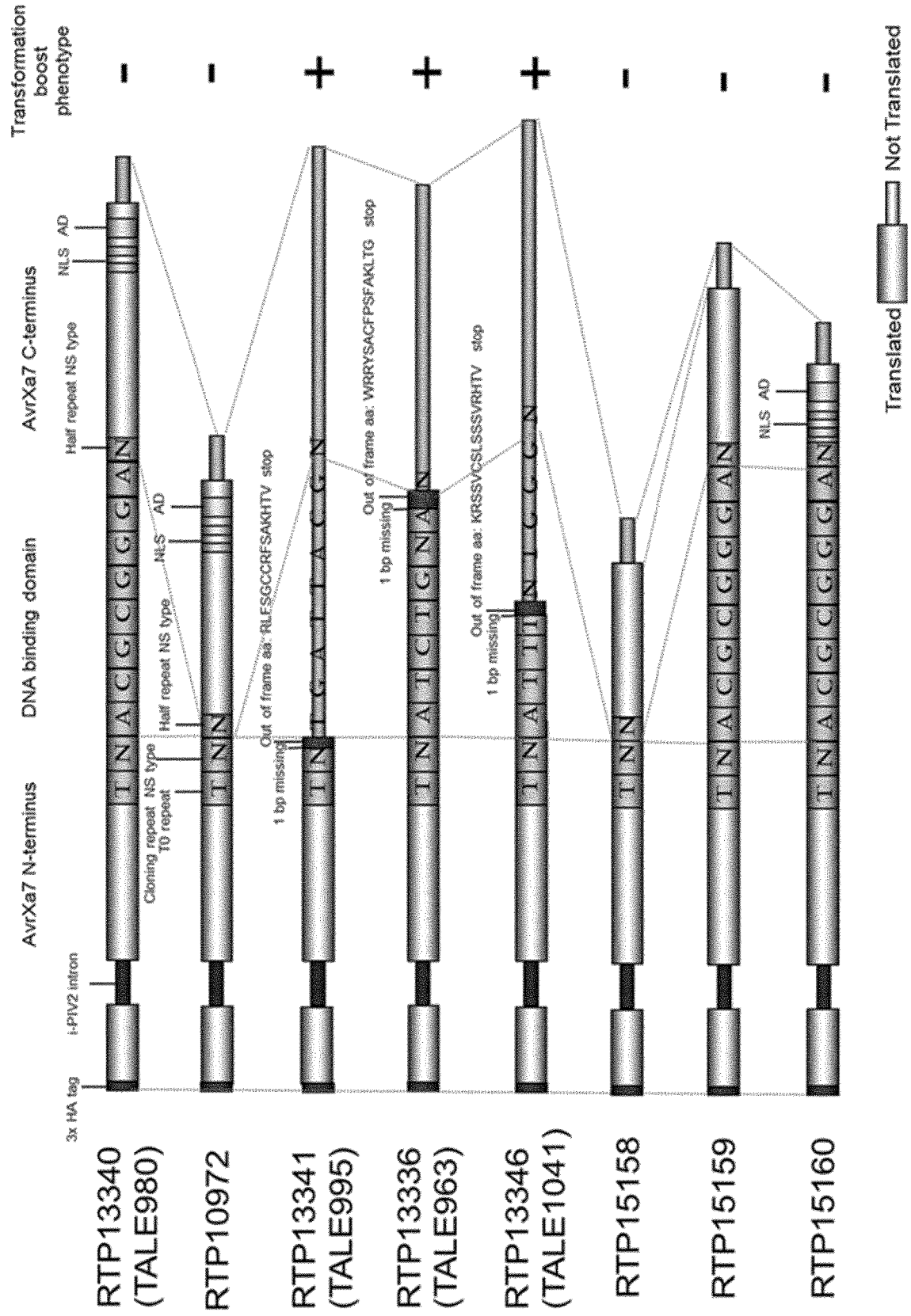

FIG. 4: Further constructs used in the present studies

Figure 5:
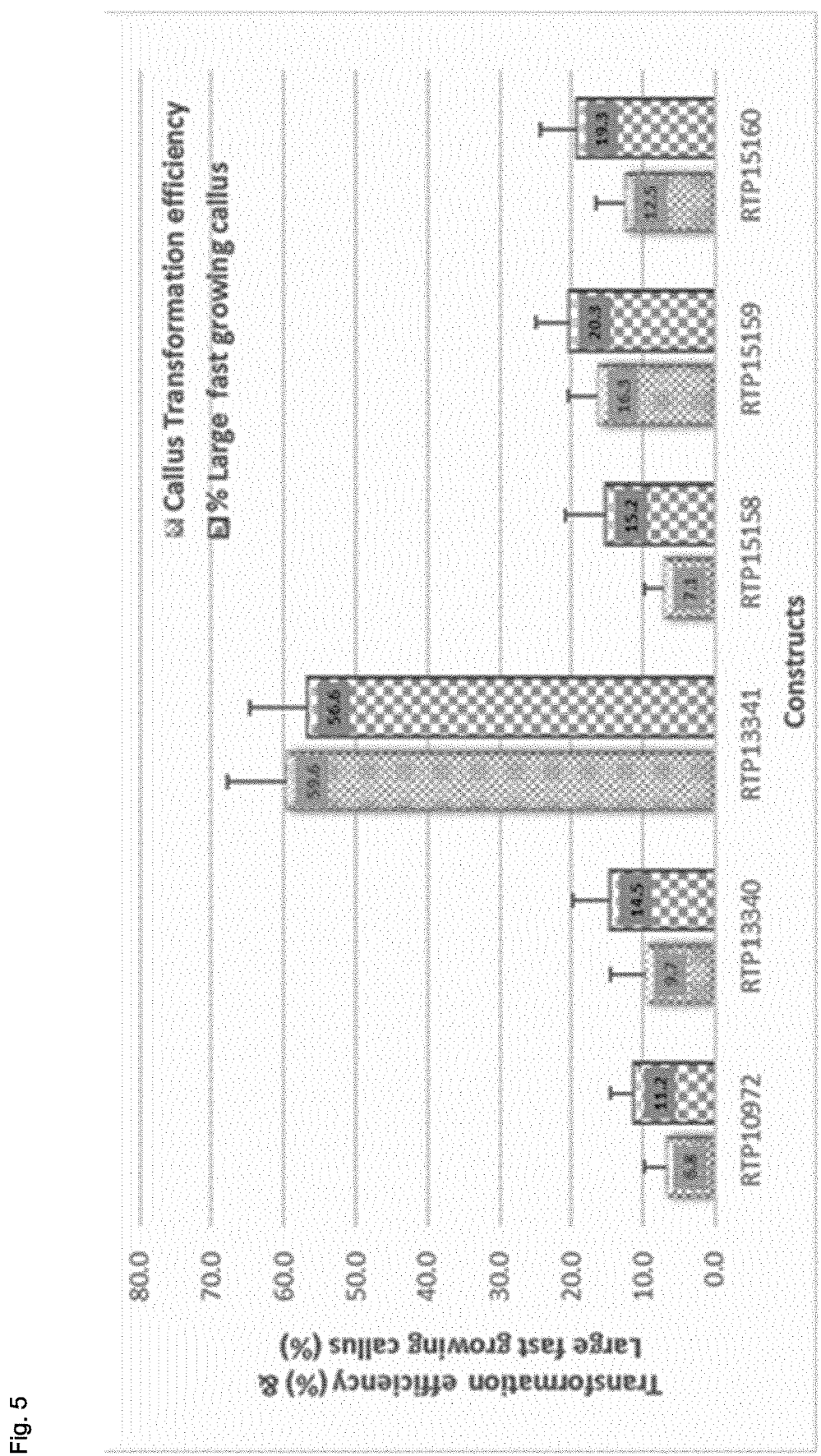

FIG. 5. Transformation efficiency and % large fast-growing callus following transformation using six different TALE constructs (including control construct) in corn.

Figure 6:
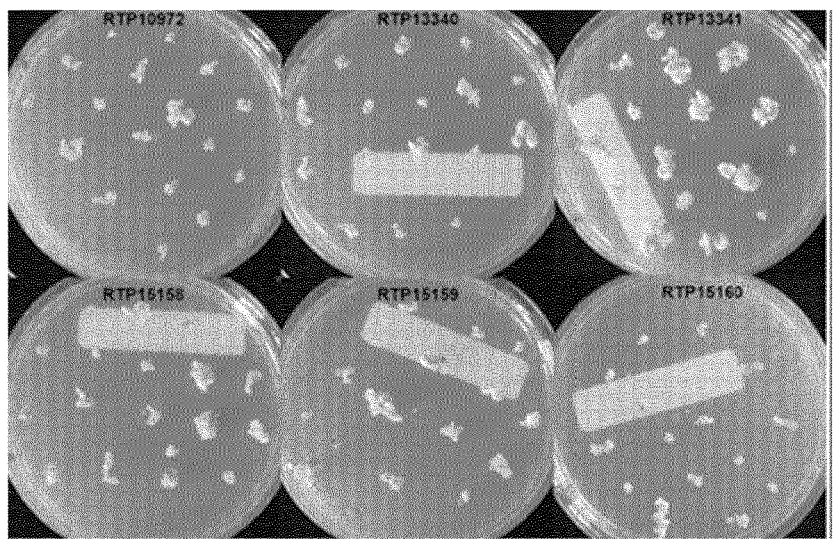
Figure 7:
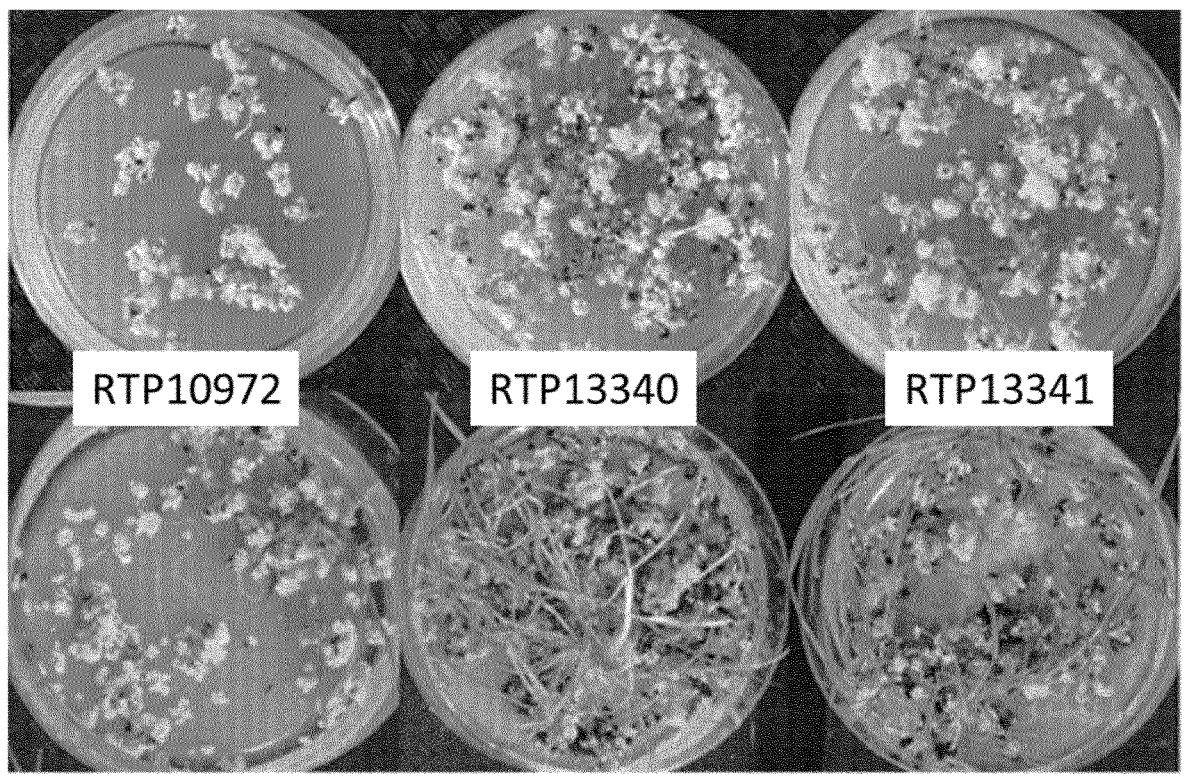

FIG. 6. Corn Transformation using six TALE constructs (including control construct). Callus growth on culture media FIG. 7. Rice transformation using three TALE constructs (including control construct). Upper panel—DsRed expressing callus from three constructs and, Lower panel—Plant regeneration from DsRed expressing callus from three constructs.

FIG. 8. Alignment between four N-terminal regions of different TALE polypeptides. As it can be seen from the alignment, there is a high degree of sequence identity between TALE polypeptides from different species. (AvrXa10: SEQ ID NO: 18, AvrXa7: SEQ ID NO: 19, AvrBS3: SEQ ID NO: 20, Hax3: SEQ ID NO: 21). The N-terminal region comprises the T3S and translocation signal and repeats −3, −2, −1 and 0 of AvrXa10, AvrXa7, AvrBS3, and Hax3, respectively.

FIG. 9 Domains in AvrXa 7 (SEQ ID NO: 10)

FIG. 10 a) amino acid sequence RTP13341 (TALE995). The T3S and translocation signal and the TO repeat are underlined.
  b) amino acid sequence RTP13341 (TALE995) without HA-tag and unnatural amino acids as result of frameshift FIG. 11 a) amino acid sequence RTP13336. The T3S and translocation signal and the TO repeat are underlined.
  b) amino acid sequence RTP13336 without HA-tag and unnatural amino acids as result of frameshift FIG. 12 a) amino acid sequence RTP13346. The T3S and translocation signal and the TO repeat are underlined.
  b) amino acid sequence RTP13346 without HA-tag and unnatural amino acids as result of frameshift

EXAMPLES

Identification of a Truncated TAL Effector (RTP13341) which Boosts Transformation, Sequence and Phenotype RTP13341 containing TALE995 under control of the constitutive ZmUBI promoter was isolated after high throughput cloning of randomized DNA concatemers encoding TALE DNA binding repeats in the plant transformation scaffold vector RTP10972 (FIG. 1). Repeats were concatemerized by ligating CCCT 5' overhangs to GGGA 5' overhangs of individual, double stranded TALE repeat-encoding DNA modules and a chain of 8 repeats intended to recognize the sequence TGATTACG was cloned into a BsmBI site in the cloning repeat of RTP10972 using compatible cohesive ends (FIG. 1). The first cloned repeat, which has the RVD sequence for recognition of T, possessed a single base pair deletion immediately following CCCT (FIG. 1). This results in a frame-shift which adds the sequence RLFSGCCRF-SAKHTV (SEQ ID NO: 14) to the truncated TALE before encountering a stop codon. All remaining TALE DNA binding repeats and the C-terminus of TALE including NLSs and AD are not translated. A TALE requires the presence of at least 8 units in the DNA binding domain to meet the minimal affinity for transcriptional activation (Boch et al., 2009) and amino acids after the half repeat are required for proper folding of the DNA binding domain (Zhang et al., 2011). RTP13341 was transformed into corn model line HillaxA188/J553 using Agrobacterium and immature embryos as target tissue for T-DNA delivery. Transformation efficacy was boosted by a factor 2 fold over transformation of controls which lacked the TALE portion

TABLE 1

Qualitative data on transformation and growth changes observed between RTP13341 and control constructs in multiple experiments.

|  | RTP11885 | RTP10927 | RTP13341 |
|---|---|---|---|
| Transient Expression (DsRED cells per embryo) | 100's | 100's | 100's |
| % Stable Transformation Efficiency (unique events/embryos started) | 50% | 50% | 100% |
| Callus event size diameter in cm (3 weeks on selection) | 1-2 | 1-2 | 3-5 |
| Weeks from Transformation to plantlet formation | 6 | 6 | 3 |
| Overall biomass or size | normal | normal | larger |
| Weeks to anthesis (from transplantation greenhouse) | 6-8 | 6-8 | 4-6 |
| seed number (qualitative, more data needed) | normal | normal | slightly larger | of the T-DNA (RTP11885) and RTP10972. Most plantlets developed significantly faster (FIG. 2) allowing transfer to the greenhouse 3 weeks earlier. For further confirmation, the transformation experiment was repeated both for model line and J553 inbred line. In both cases the same results were found. Both the empty scaffold vector RTP10972 as well as regular TALEs, for instance TALE980 in RTP13340 (also derived from RTP10972), did not yield the growth-promoting phenotype. The empty scaffold TALE, like TALE995 has very low affinity to bind DNA. Therefore, the absence of the C-terminus of TALE is a prerequisite for obtaining the reported phenotype. TALE995 does not improve Agrobacterium function, because of the presence of the i-PIV2 intron in the 5' coding end. We determined the T-DNA integration copy number and observed no abnormalities as compared to transformation of controls (Table 2). We identified two additional constructs from our libraries which are not encoding a fully functional TALE. RTP13336 (FIG. 1 and Table 1) encodes a truncated polypeptide that ends after the cloned DNA binding units ATCTGNA and RTP13346 ends after the cloned binding units ATTT (not shown). Both are not expected to be able to bind DNA and do not possess translated NLS and AD. Phenotypes were shown to be the same and confirmed the RTP13341 result.

TABLE 2

Copy numbers determined through TaqMan assays on t-nos.

| Copy # | 1 | 2 | 3 | 4 |
|---|---|---|---|---|
| RTP13341 | 8 (47%) | 5 (29%) | 1 (6%) | 3 (18%) |
| RTP13336 | 6 (38%) | 3 (19%) | 2 (12%) | 5 (31%) |

Approximately 85% of all events with RTP13341, RTP13336 and RTP13346 displayed the enhanced transformation, regeneration and growth phenotype. In more rare cases we observed excessive tillering or abnormal leaf development (FIG. 3). All phenotypes seem to be linked and may represent different manifestations of increased meristematic activity. Surprisingly, in the Further Constructs A new set of experiments was initiated to answer two basic questions: (1) what are the exact prerequisites for truncated TALE mode of action in corn and (2) does TALE995 also work in other crops. Rice was selected since the action in maize is not dependent on specific DNA binding.

We constructed plasmids RTP15158 (RTP10972 without NLS and AD), RTP15159 (RTP13340 without NLS and AD) and RTP15160 (RTP13340 without the C-terminus FIG. 4) for the first goal and introduced RTP13341 into rice cv Nipponbare for the second goal.

Corn Transformation Using TALE Vectors

Transformation of corn (cv. J553) were performed using six constructs—RTP10972, RTP13340, RTP13341, RTP15158, RTP15159, RTP15160

Transformation replicated 9 times, for each replication immature embryos from one corn ear were divided among all the six constructs Transformed embryos were placed on AHAS selection for initially 4 weeks, and then transferred to fresh AHAS selection media for further 4 weeks After 2 weeks of transformation, fast growing embryo-deriving callus were counted based on their size (>~4 mm)

For transformation efficiency, DsRed expressing embryo-derived callus (callus with at least one foci) were counted after 4 weeks of selection. These data were collected from all the 9 replications.

To study developmental time line of corn callus, all the callus within the treatment were visually ranked according to their appearance, which are: 0=Non-regenerable, 1=potential embryogenic, 2=Embryogenic structures Type-2 callus, 3=Organized Type-1 callus, 4=Callus with photosynthetic shoots/plantlets. These data were collected from 6 replications.

TABLE 3

Physiological characteristics of corn callus after 7-8 weeks of selection. All the callus were visually ranked according to their appearance following transformation and selection. Data shows % of callus with SEm.

Physiological characteristics of callus after 7-8 weeks of selection

| Constructs | % Callus with photosynthetic Shoot/Plantlets | % Type-1 callus, with green structure | % Embryogenic Structure - Type-2 | % Potential embryogenic | % Non regenerable |
|---|---|---|---|---|---|
| RTP10972 | 2.5 ± 1.3 | 4.7 ± 1.8 | 6.8 ± 1.0 | 14.8 ± 2.1 | 71.2 ± 3.7 |
| RTP13340 | 3.1 ± 1.9 | 5.9 ± 2.1 | 3.9 ± 03 | 16.8 ± 2.3 | 70.3 ± 3.5 |
| RTP13341 | 28.7 ± 4.0 | 23.1 ± 3.3 | 12.0 ± 2.6 | 10.8 ± 2.3 | 25.4 ± 5.1 |
| RTP15158 | 2.4 ± 1.0 | 3.0 ± 1.1 | 10.4 ± 3.0 | 19.1 ± 4.2 | 65.1 ± 6.2 |
| RTP15159 | 4.8 ± 2.0 | 7.8 ± 3.0 | 10.8 ± 2.0 | 14.4 ± 1.5 | 62.2 ± 5.3 |
| RTP15160 | 3.0 ± 1.4 | 3.1 ± 1.1 | 7.2 ± 1.6 | 19.4 ± 2.8 | 67.3 ± 3.9 |

Results

Transformation efficiency from construct carrying truncated TALE (RTP13341) is ~60% which is 10× higher than control construct (RTP10972), and 4-6× higher than other TALE constructs (FIG. 5)

High percentage of callus which are transformed with truncated TALE (construct RTP13341), grows significantly faster and larger than callus transformed with other constructs (FIG. 5)

Multiple events expressing DsRed were observed in most of the embryo-derived callus transformed with RTP13341 constructs, whereas only 1 or 2 events expressing DsRed were observed in callus transformed with other constructs (not shown)

Around 29% of callus transformed with RTP13341 formed photosynthetic shoot/plantlets compared to 2-5% of callus transformed with other constructs (Table 3)

Callus transformed with truncated TALE (RTP13341) had 3-7× higher percentage of regenerable, Type-1 callus compared to callus transformed with control and other TALE constructs (Table 3)

Only 25% of callus transformed with RTP13341 were non-regenerable after 7-8 weeks of selection whereas 65-70% of callus transformed with other constructs were non-regenerable (Table 3). These suggests shorter developmental timeline in in-vitro for callus expressing TALE995 construct RTP13341.

Rice Transformation Using TALE Vectors

Transformation of rice (cv. Nipponbare) were performed using three constructs—RTP10972, RTP13340, RTP13341

Transformation performed only once

Transformed germinating seeds were placed on AHAS selection for initially 3-4 weeks followed by micro-calli isolations and then transferred to fresh AHAS selection media for further 3-4 weeks For callus transformation efficiency, DsRed expressing callus (callus with at least one foci) were counted after 6 weeks of selection.

After 7-8 weeks of selection, callus events were transferred to regeneration media and regenerated plant events expressing DsRed in roots were counted for plant transformation efficiency

TABLE 4

Number of callus and plant events expressing DsRed following transformation using three different TALE constructs (including control construct) in rice. Percentage in parenthesis are transformation efficiencies.

| Constructs | Explant used | # Isolated micro-calli | # DsRed Expressing Callus events (% efficiency) | # Transgenic plant events (% Efficiency) |
|---|---|---|---|---|
| RTP10972 | 23 | 40 | 7 (30.4%) | 2 (8.7%) |
| RTP13340 | 11 | 46 | 19 (172.7%) | 5 (45.5%) |
| RTP13341 | 25 | 163 | 142 (568%) | 21 (84%) |

Callus transformation efficiency from construct carrying truncated TALE (RTP13341) is >500% which is ~19× higher than control construct (RTP10972), and 3× higher than another TALE RTP13340 construct (Table 4)

Plant transformation efficiency from construct carrying truncated TALE (RTP13341) is 84% which is ~10× higher than control construct (RTP10972), and double than another TALE construct RTP13340 (Table 4).

Summary/Conclusions

We describe a general increase in transformation efficacy in corn by overexpression of the N-terminus of the transcription activator-like effector (TALE) AvrXa7 from *Xanthomonas oryzae* in the plant transformation vector RTP13341. The transformation efficacy was increased by a factor of more than 2 fold over controls and plants were moved to the greenhouse 3 weeks earlier. The effect is independent of specific DNA binding and transcriptional activation as both corresponding domains are not functionally present in the truncated protein. This notion was further supported by the fact that introduction of RTP13341 into rice produced similar results. RTP13341 was fortuitously isolated from a large collection of plasmids with randomized TALEs. The randomization is dependent on PCR and this step is most likely responsible for a single base pair deletion in the first 34 aa repeat after the T0 repeat, which disrupts the open reading frame and leads to a stop 15 amino acids downstream from the deletion. The absence of the transcriptional activation domain (AD), nuclear localization signal (NLS) and C-terminus is a prerequisite for the positive effect of RTP13341. The positive effect was confirmed in maize model line J553x(HillaxA188) and J553 and rice cv. Nipponbare. The presence of an intron implies that improved Agrobacterium fitness, plant cell attachment and T-DNA transfer are not the leading cause of improved transformation efficacy. Copy numbers were found to be normal. Thus, RTP13341 seems to have a general effect on plant development giving more cells with T-DNA integration events the opportunity to regenerate while accelerating development at the same time. This truncated TALE polypeptide, if applied may have value in genome editing, allowing cells with rare genome editing events to progress to full development in an array of different plant species.

TALE995 can be used to enhance transformation in corn, rice and other plant species. It can be stably maintained on the incoming T-DNA and optionally removed in later stages or in the next generation using genome editing tools, like CRI PSR/Cas9 or TALEN. Alternatively, it may be possible to deliver it transiently; either as episomal-encoded DNA (including viral vectors) or as mRNA/protein. Agrobacterium may be able to deliver the TALE995 transformation booster protein as a fusion with the type IV secretion signal of VirF. The type III secretion system is expected to be able to deliver functional protein as well as TALEs naturally are translocated through this system.

In genome editing the presence of TALE995 may give cells that have received a rare, successful genome edit, a better chance to progress to callus formation, organ formation and eventually seed production. TALE could be delivered transiently or simply be encoded next to genome editing tool coding sequences, like CRISPR/Cas9. After genome editing, the transgene can be segregated along with the genome editing tool genes.

REFERENCES

H. Scholze and J. Boch (2011). TAL effectors are remote controls for gene activation. Current Opinion in Microbiology 14:47-53

J. Boch, H. Scholze, S. Schornack, A. Landgraf, S. Hahn, S. Kay, T. Lahaye, A. Nickstadt and U. Bonas (2009). Breaking the Code of DNA Binding Specificity of TAL-Type III Effectors. Science 326: 1509-1512

F. Zhang, L. Cong, S. Lodato, S. Kosuri, G. Church and P. Arlotta (2011). Nat Biotechnol. 29(2): 149-153

Christian, M., T. Cermak, E. L. Doyle, C. Schmidt, F. Zhang, A. Hummel, A. J. Bogdanove and D. F. Voytas (2010). "Targeting DNA double-strand breaks with TAL effector nucleases." Genetics 186(2): 757-761.

Miller, J. C., S. Tan, G. Qiao, K. A. Barlow, J. Wang, D. F. Xia, X. Meng, D. E. Paschon, E. Leung, S. J. Hinkley, G. P. Dulay, K. L. Hua, I. Ankoudinova, G. J. Cost, F. D. Urnov, H. S.

Zhang, M. C. Holmes, L. Zhang, P. D. Gregory and E. J. Rebar (2011). "A TALE nuclease architecture for efficient genome editing." Nat Biotechnol 29(2): 143-148.

Mussolino, C., R. Morbitzer, F. Lutge, N. Dannemann, T. Lahaye and T. Cathomen (2011). "A novel TALE nuclease scaffold enables high genome editing activity in combination with low toxicity." Nucleic Acids Res 39(21): 9283-9293.

Sun, N., J. Liang, Z. Abil and H. Zhao (2012). "Optimized TAL effector nucleases (TALENs) for use in treatment of sickle cell disease." Mol Biosyst 8(4): 1255-1263.

Christian et al., Miller et al., 2011, Mussolino et al., 2011, Sun et al., 2012

Moore et al., ACS Synth Biol. 2014 Oct. 17; 3(10):708-16

Scott et al., FEBS J. 2014 October; 281(20):4583-97.

Zhang et al., Nat Biotechnol. 2011 February; 29(2): 149-153.

Wan et al., Biomed Res Int. 2016; 2016: 8036450.

Cuculis et al., Nat Commun. 2015; 6: 7277

Plant Cell Rep (2007) 26:1567-1573

Mohanta T K, Bashir T, Hashem A, Abd_Allah E F, Bae H. Genome Editing Tools in Plants. Genes. 2017; 8(12):399.

Winicov et al., Planta (2004) 219: 925-935

Ji et al. Nature Communications volume 7, Article number: 13435 (2016)

Schornack et al. Plant J. 2004 January; 37(1):46-60.

Schornack et al. Molecular Plant-Microbe Interactions 2005 18:11, 1215-1225

Triplett et al. Plant J. 2016 September; 87(5):472-83.

Read et al., Front Plant Sci. 2016 Oct. 13; 7:1516.

The invention claimed is:

1. A method for generating a transgenic plant comprising at least one polynucleotide of interest, the method comprising
    (a) providing
        (i) a truncated transcription activator-like effector (TALE) polypeptide, wherein said truncated TALE polypeptide comprises the N-terminal region of a TALE polypeptide, and optionally a complete or incomplete Central Repeat Region (CRR), and wherein said truncated TALE polypeptide, does not comprise a transcriptional activation domain and is not fused to a nuclease domain, and/or
        (ii) a polynucleotide encoding the truncated transcription activator-like effector (TALE) polypeptide of (i),
    (b) providing at least one polynucleotide of interest,
    (c) introducing the polypeptide or polynucleotide provided in step (a), and the at least one polynucleotide of interest provided in step (b) into a plant cell, and
    (d) regenerating a transgenic plant comprising the at least one polynucleotide of interest from said plant cell, wherein the truncated TALE polypeptide is from a TALE polypeptide having a sequence as shown in SEQ ID NO: 10.

2. The method of claim 1, wherein the transgenic plant regenerated in step (d) further comprises the polynucleotide encoding the truncated transcription activator-like effector (TALE) polypeptide.

3. A method for improving plant transformation, the method comprising
    (a) providing
        (i) a truncated transcription activator-like effector (TALE) polypeptide, wherein said truncated TALE polypeptide comprises the N-terminal region of a TALE polypeptide, and optionally a complete or incomplete Central Repeat Region (CRR), and wherein said truncated TALE polypeptide does not comprise a transcriptional activation domain and is not fused to a nuclease domain, and/or
        (ii) a polynucleotide encoding the truncated transcription activator-like effector (TALE) polypeptide of (i),
    (b) providing at least one polynucleotide of interest, and
    (c) introducing the polypeptide or polynucleotide provided in step (a) and the at least one polynucleotide of interest provided in step (b) into a plant, thereby improving plant transformation, wherein the truncated TALE polypeptide is from a TALE polypeptide having a sequence as shown in SEQ ID NO: 10.

4. The method of claim 1, wherein said truncated TALE polypeptide does not comprise nuclear localization signals (NLSs).

5. The method of claim 1, wherein said N-terminal region of the TALE polypeptide comprises the T3S and translocation signal and repeats −3, −2, −1 and 0 of a TALE polypeptide.

6. The method of claim 1, wherein the N-terminal region comprises amino acids 1 to 288 of SEQ ID NO: 10.

7. The method of claim 1, wherein said truncated TALE polypeptide comprises an incomplete Central Repeat Region (CRR).

8. The method of claim 7, wherein the incomplete Central Repeat Region (CRR) comprises between 0.5 and 20 repeats, such as between 0.5 and 10 repeats, between 0.5 repeats and 8 repeats, between 0.5 and 6 repeats, between 0.5 and 5 repeats, between 0.5 and 4 repeats, between 0.5 and 3 repeats, between 0.5 and 2 repeats, or between 0.5 and 1 repeats.

9. The method of claim 7, wherein the incomplete Central Repeat Region comprises or consists of the amino acid sequence ltpeqvvaiasnsggkqal (SEQ ID NO: 23).

10. The method of claim 9, wherein the truncated TALE polypeptide is truncated within repeats 1 to 20, repeats 1 to 15, repeats 1 to 10, repeats 1 to 8, repeats 1 to 6, repeats 1 to 5, repeats 1 to 4, repeats 1 to 3, repeats 1 to 2, or within repeat 1 of the CRR of the TALE polypeptide.

11. The method of claim 1, wherein the truncated TALE polypeptide has the amino acid sequence comprising or consisting of
    (i) the sequence as shown in any one of SEQ ID Nos: 1, 2, 3, 7, 8, and 9
    (ii) the sequence comprising amino acids 1 to 307 of SEQ ID NO: 10
    (iii) the sequence comprising amino acids 1 to 443 of SEQ ID NO: 10, or
    (iv) the sequence comprising amino acids 1 to 544 of SEQ ID NO: 10.

12. The method of claim 1, wherein the polynucleotide encoding said truncated TALE polypeptide, comprises or consists of the sequence as shown in any one of SEQ ID Nos: 4 to 6.

13. The method of claim 1, wherein the plant transformation is Agrobacterium-mediated transformation, and wherein in step c) at least the at least one polynucleotide of interest as provided in step b) is stably introduced into the plant by Agrobacterium-mediated transformation.

14. The method of claim 13, wherein i) the truncated TALE polypeptide, or ii) the polynucleotide encoding said truncated polypeptide, is transiently introduced into the plant.

15. The method of claim 14, wherein both the polynucleotide encoding said truncated TALE polypeptide, as provided in step (a)(ii), and the at least one polynucleotide of interest as provided in step b) are stably introduced into the plant by Agrobacterium-mediated transformation.

16. The method of claim 15, wherein the polynucleotide encoding said truncated TALE polypeptide, as provided in step (a)(ii), and the at least one polynucleotide of interest as provided in step b) are present in the same T-DNA or in different T-DNAs.

17. The method of claim 1, wherein the polynucleotide provided in step (a) (ii) and the polynucleotide provided in step (b) are operably linked to a promoter.

18. The method of claim 1, wherein the plant is a monocotyledonous plant.

19. The method of claim 1, wherein the plant is a dicotyledonous plant.

20. The method of claim 3, wherein the improvement of plant transformation is selected from
   (i) enhanced transformation efficacy,
   (ii) a faster growth of transformed calli,
   (iii) a faster generation of T0 plants, and
   (iv) an increased biomass of generated T0 plants.

21. The method of claim 1, wherein the polynucleotide of interest encodes a gene-editing polypeptide.

22. The method of claim 1, wherein the truncated TALE polypeptide has the amino acid sequence comprising or consisting of SEQ ID NO: 1.

23. The method of claim 1, wherein the truncated TALE polypeptide has the amino acid sequence comprising or consisting of SEQ ID NO: 7.

24. The method of claim 1, wherein the polynucleotide has the nucleotide sequence comprising or consisting of SEQ ID NO: 4.

25. The method of claim 3, wherein the truncated TALE polypeptide has the amino acid sequence comprising or consisting of SEQ ID NO: 1.

26. The method of claim 3, wherein the truncated TALE polypeptide has the amino acid sequence comprising or consisting of SEQ ID NO: 7.

27. The method of claim 3, wherein the polynucleotide has the nucleotide sequence comprising or consisting of SEQ ID NO: 4.

28. The method of claim 3, wherein said truncated TALE polypeptide does not comprise nuclear localization signals (NLSs).

29. The method of claim 3, wherein said N-terminal region of the TALE polypeptide comprises the T3S and translocation signal and repeats-3,-2,-1 and 0 of a TALE polypeptide.

30. The method of claim 3, wherein the N-terminal region comprises amino acids 1 to 288 of SEQ ID NO: 10.

31. The method of claim 3, wherein the truncated TALE polypeptide has the amino acid sequence comprising or consisting of
   (i) the sequence as shown in any one of SEQ ID Nos: 1, 2, 3, 7, 8, and 9
   (ii) the sequence comprising amino acids 1 to 307 of SEQ ID NO: 10
   iii the sequence comprising amino acids 1 to 443 of SEQ ID NO: 10, or
   (iv) the sequence comprising amino acids 1 to 544 of SEQ ID NO: 10.

\* \* \* \* \*